(12) United States Patent
Kazmi et al.

(10) Patent No.: US 9,894,545 B2
(45) Date of Patent: Feb. 13, 2018

(54) METHODS OF CONTROLLING SIMULTANEOUS TRANSMISSION/RECEPTION OF A RADIO NODE IN A TDD SYSTEM

(71) Applicant: Telefonaktiebolaget L M Ericsson (publ), Stockholm (SE)

(72) Inventors: Muhammad Kazmi, Bromma (SE); Iana Siomina, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 24 days.

(21) Appl. No.: 14/434,044

(22) PCT Filed: Feb. 3, 2015

(86) PCT No.: PCT/SE2015/050115
§ 371 (c)(1),
(2) Date: Apr. 7, 2015

(87) PCT Pub. No.: WO2015/115997
PCT Pub. Date: Aug. 6, 2015

(65) Prior Publication Data
US 2016/0029231 A1 Jan. 28, 2016

Related U.S. Application Data

(60) Provisional application No. 61/935,208, filed on Feb. 3, 2014.

(51) Int. Cl.
*H04W 24/08* (2009.01)
*H04W 72/12* (2009.01)
(Continued)

(52) U.S. Cl.
CPC .............. *H04W 24/08* (2013.01); *H04L 5/14* (2013.01); *H04W 72/0446* (2013.01);
(Continued)

(58) Field of Classification Search
CPC ....................................................... H04W 24/08
(Continued)

(56) References Cited

U.S. PATENT DOCUMENTS 9,363,847 B2 * 6/2016 Charbit ............ H04W 52/0235
9,363,947 B2 * 6/2016 Ramer ................. A01D 87/127
(Continued)

FOREIGN PATENT DOCUMENTS

EP 2 768 157 A2 8/2014

OTHER PUBLICATIONS

PCT Notification of Transmittal of the International Search Report and the Written Opinion of the International Searching Authority, or the Declaration for International application No. PCT/SE2015/050115, dated May 27, 2015.
(Continued)

*Primary Examiner* — Andrew Lai
*Assistant Examiner* — Andrew C Lee
(74) *Attorney, Agent, or Firm* — Baker Botts LLP

(57) ABSTRACT

According to some embodiments, a method comprises determining a first uplink-downlink, UL-DL, configuration used in a first cell, determining a second uplink-downlink, UL-DL, configuration used in a second cell, and determining that the first UL-DL configuration and the second UL-DL configuration are different during an at least partly overlapping time period. The method comprises adapting at least one of a measurement configuration for performing a measurement in at least one of the first cell and the second cell, scheduling transmission of signals at the radio node in at least one of the first cell and the second cell, and scheduling reception of signals at the radio node in at least one of the first cell and the second cell.

29 Claims, 17 Drawing Sheets

(51) Int. Cl.
  *H04L 5/14* (2006.01)
  *H04W 72/04* (2009.01)
  *H04L 5/00* (2006.01)

(52) U.S. Cl.
  CPC ... *H04W 72/1226* (2013.01); *H04W 72/1268* (2013.01); *H04W 72/1273* (2013.01); *H04L 5/0048* (2013.01)

(58) Field of Classification Search
  USPC .................................. 370/252, 280, 329, 336
  See application file for complete search history.

(56) References Cited

U.S. PATENT DOCUMENTS

| | | | | |
|---|---|---|---|---|
| 2008/0069062 | A1* | 3/2008 | Li | H04W 52/265 370/338 |
| 2011/0080896 | A1* | 4/2011 | Krishnamurthy | H04W 56/0045 370/336 |
| 2012/0082048 | A1* | 4/2012 | Taft | H04L 12/1836 370/252 |
| 2012/0082070 | A1* | 4/2012 | Hart | H04J 11/0023 370/280 |
| 2012/0230272 | A1* | 9/2012 | Kim | H04L 1/1861 370/329 |
| 2012/0327821 | A1 | 12/2012 | Lin et al. | |
| 2013/0188516 | A1* | 7/2013 | He | H04W 28/16 370/254 |
| 2013/0258958 | A1* | 10/2013 | Dinan | H04W 56/0045 370/329 |
| 2013/0329704 | A1* | 12/2013 | Lee | H04J 3/1694 370/336 |
| 2013/0336160 | A1* | 12/2013 | Yin | H04L 1/1854 370/254 |
| 2014/0036740 | A1* | 2/2014 | Lee | H04W 72/0406 370/280 |
| 2014/0036814 | A1* | 2/2014 | Zhang | H04W 72/1294 370/329 |
| 2014/0078941 | A1* | 3/2014 | Seo | H04L 1/1822 370/280 |
| 2014/0086112 | A1* | 3/2014 | Stern-Berkowitz | H04W 72/1289 370/280 |
| 2014/0119248 | A1* | 5/2014 | Park | H04L 5/0044 370/280 |
| 2014/0146697 | A1* | 5/2014 | Kim | H04B 7/0413 370/252 |
| 2014/0187243 | A1* | 7/2014 | Rune | H04W 36/26 455/436 |
| 2014/0198680 | A1* | 7/2014 | Siomina | H04L 5/14 370/252 |
| 2014/0198773 | A1* | 7/2014 | Yin | H04L 5/001 370/336 |
| 2015/0016371 | A1* | 1/2015 | Lee | H04J 11/0053 370/329 |
| 2015/0043434 | A1* | 2/2015 | Yamada | H04W 72/0446 370/329 |
| 2015/0173024 | A1* | 6/2015 | Seo | H04W 52/146 370/329 |
| 2015/0249936 | A1* | 9/2015 | Chen | H04W 28/065 370/329 |
| 2015/0358962 | A1* | 12/2015 | Lee | H04W 72/0446 370/336 |

OTHER PUBLICATIONS

3GPP TSG-RAN WG4 Meeting #73; San Francisco, US; Title: Different TDD configurations in CA; Source to WG: Ericsson; Source to TSG: R4 (R4-147468), Nov. 17-21, 2014.

3GPP TS 36.133 V12.2.0; Technical Specification; 3rd Generation Partnership Project; Technical Specification Group Radio Access Network; Evolved Universal Terrestrial Radio Access (E-UTRA); Requirements for support of radio resource management (Release 12), Dec. 2013.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Fig. 3

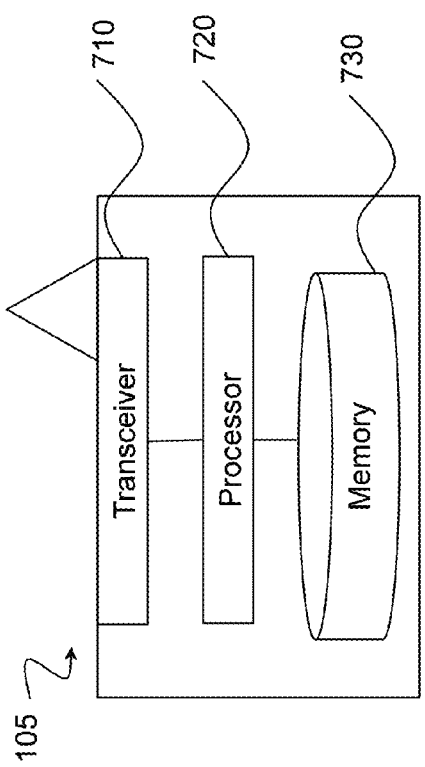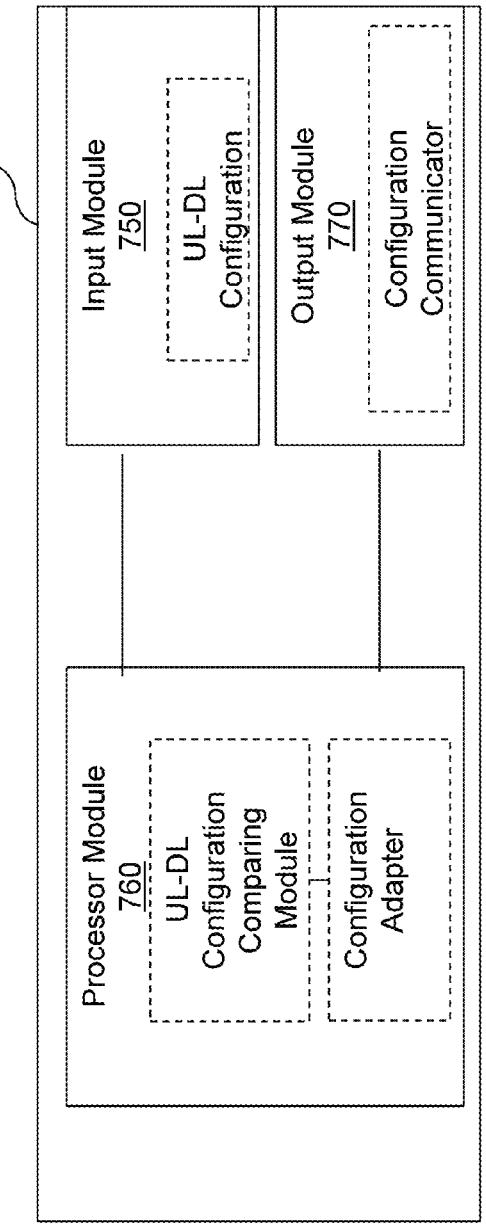

METHODS OF CONTROLLING SIMULTANEOUS TRANSMISSION/RECEPTION OF A RADIO NODE IN A TDD SYSTEM

PRIORITY

This nonprovisional application is a U.S. National Stage Filing under 35 U.S.C. §371 of International Patent Application Serial No. PCT/SE2015/050115 filed Feb. 3, 2015, and entitled "METHODS OF CONTROLLING SIMULTANEOUS TRANSMISSION/RECEPTION OF A RADIO NODE IN A TDD SYSTEM" which claims priority to U.S. Provisional Patent Application No. 61/935,208 filed Feb. 3, 2014, both of which are hereby incorporated by reference in their entirety.

TECHNICAL FIELD

Certain embodiments relate, in general, to wireless communications and, more particularly, to methods of controlling simultaneous transmission/reception of a radio node in a time division duplex (TDD) system.

BACKGROUND

In a wireless network, a user equipment (UE) may communicate with one or more radio network nodes (e.g., an eNodeB or eNB) to transmit and/or receive voice traffic, data traffic, control signals, and so on. The UE and radio network nodes may be capable of making radio measurements to in order to support various functionality, as further described below.

Radio measurements done by the UE may typically be performed on the serving as well as on neighbor cells over some known reference symbols or pilot sequences. Such measurements may be referred to as "UE measurements." The measurements can be done on cells on an intra-frequency carrier, inter-frequency carrier(s) as well as on inter-radio access technology (inter-RAT) carriers(s) (depending upon the UE capability whether it supports that RAT). To enable inter-frequency and inter-RAT measurements for the UE requiring gaps, the network may configure the measurement gaps. As an example, during a gap, the UE may stop measuring a signal on a current cell, switch to a target cell to measure a signal on the target cell, and then come back to the current cell. Two periodic measurement gap patterns both with a measurement gap length of 6 ms are defined for LTE. Some measurements may also require the UE to measure the signals transmitted by the UE in the uplink.

The measurements are done for various purposes. Some example measurement purposes are: mobility, positioning, self-organizing network (SON), minimization of drive tests (MDT), operation and maintenance (O&M), network planning and optimization, etc. The measurements may be performed over a relatively long time duration on the order of a few 100 ms up to several seconds. The same measurements may be applicable in single carrier and carrier aggregation (CA). However, in carrier aggregation the measurement requirements may be different. For example the measurement period may be different in CA (e.g., it can be either more relaxed or more stringent depending upon whether the secondary component carrier, SCC, is activated or not). This may also depend upon the UE capability (e.g., whether a CA capable UE is able to perform measurement on SCC with or without gaps).

Examples of mobility measurements in LTE are cell identification (e.g., physical cell identifier, PCI, acquisition), reference symbol received power (RSRP), reference symbol received quality (RSRQ), and cell global identifier (CGI) acquisition. The mobility measurement may also comprise of identifying or detecting a cell, which may belong to LTE, HSPA, CDMA2000, GSM, etc. The cell detection comprises identifying at least the PCI and subsequently performing the signal measurement (e.g., RSRP) of the identified cell. The UE may also have to acquire the CGI of a cell. More specifically the system information (SI) is read by the UE to acquire the CGI, which uniquely identifies a cell, of the target cell. The UE may also be requested to acquire other information from the target cell, such as closed subscriber group (CSG) indicator, CSG proximity detection, etc.

Examples of UE positioning measurements in LTE are reference signal time difference (RSTD) and UE receive-transmit (RX-TX) time difference measurement. The UE RX-TX time difference measurement requires the UE to perform measurement on the downlink reference signal as well as on the uplink transmitted signals.

Example of other measurements which may be used for radio link maintenance, MDT, SON, or for other purposes are (1) control channel failure rate or quality estimate and (2) physical layer problem detection. Examples of control channel failure rate or quality estimate include paging channel failure rate and broadcast channel failure rate. Examples of physical layer problem detection include out of synchronization (out of sync) detection, in synchronization (in-sync) detection, radio link monitoring, and radio link failure determination or monitoring.

Channel state information (CSI) measurements performed by the UE are used by the network for scheduling, link adaptation, etc. Examples of CSI measurements are channel quality indicator (CQI), pre-coding matrix indicator (PMI), rank indicator (RI), etc. They may be performed on reference signals like common reference symbol (CRS), channel state information reference symbol (CSI-RS), or demodulation reference signal (DMRS).

The radio measurements performed by the UE are used by the UE for one or more radio operational tasks. Examples of such tasks are reporting the measurements to the network, which in turn may use them for various tasks. For example, in radio resource control (RRC) connected state the UE reports radio measurements to the serving node. In response to the reported UE measurements, the serving network node makes certain decisions, as an example, it may send mobility command to the UE for the purpose of cell change. Examples of cell change are handover, RRC connection re-establishment, RRC connection release with redirection, primary cell (PCell) change in CA, primary component carrier (PCC) change in PCC, etc. In idle or low activity state example of cell change is cell reselection. In another example, the UE may itself use the radio measurements for performing tasks, such as cell selection, cell reselection, etc.

In order to support different functions such as mobility (e.g., cell selection, handover, etc.), positioning a UE, link adaption, scheduling, load balancing, admission control, interference management, interference mitigation, etc., the radio network node may also perform radio measurements on signals transmitted and/or received by the radio network node. Such measurements may be referred to as "radio network node measurements." Examples of such measurements are signal-to-noise ratio (SNR), signal-to-interference-plus-noise ratio (SINR), received interference power (RIP), block error ratio (BLER), propagation delay between UE and itself, transmit carrier power, transmit power of specific signals (e.g., Tx power of reference signals), positioning measurements, etc.

In general, communication between the UE and the radio network node may use duplex communication. A duplex communication system is a point-to-point system composed of two connected parties or devices that can communicate with one another in both directions. A half-duplex (HDX) system provides communication in both directions, but only one direction at a time (not simultaneously). A full-duplex (FDX), or sometimes referred to as a double-duplex system, allows communication in both directions, and, unlike half-duplex, allows this to happen simultaneously. Time-division duplexing (TDD) is the application of time-division multiplexing to separate outward and return signals (e.g., operating over a half-duplex communication link). Frequency-division duplexing (FDD) means that the transmitter and receiver operate at different carrier frequencies, typically separated by a frequency offset.

The LTE specification enables FDD and TDD operation modes. Additionally, half duplex operation is also specified, which is essentially FDD operation mode but with transmission and receptions not occurring simultaneously as in TDD. Half duplex mode has advantages with some frequency arrangements where the duplex filter may be unreasonable, resulting in high cost and/or high power consumption. Since carrier frequency number (evolved absolute radio frequency channel number/EARFCN) is unique, by knowing it, it is possible to determine the frequency band, which is either FDD or TDD. However, it may be more difficult to find difference between full duplex FDD and half-duplex FDD (HD-FDD) without explicit information because the same FDD band can be used as full FDD or HD-FDD.

In the 3rd Generation Partnership Project (3GPP), two radio frame structure types are currently supported: Type 1 (applicable to FDD, illustrated in FIG. 1) and Type 2 (applicable to TDD, illustrated in FIG. 2). Transmissions in multiple cells can be aggregated where up to four secondary cells can be used in addition to the primary cell. In case of multi-cell aggregation, the UE currently assumes the same frame structure is used in all the serving (primary and secondary) cells. The frame structure type 1 illustrated in FIG. 1 is applicable to both full duplex and half duplex FDD. For FDD, 10 subframes are available for downlink transmission and 10 subframes are available for uplink transmissions in each 10 ms interval. Uplink and downlink transmissions are separated in the frequency domain. In half-duplex FDD operation, the UE cannot transmit and receive at the same time while there are no such restrictions in full-duplex FDD. There is no need in guard period for full-duplex FDD. For half-duplex FDD operation, a guard period is created by the UE by not receiving the last part of a downlink subframe immediately preceding an uplink subframe from the same UE.

FIG. 3 is a table showing an example of uplink/downlink, UL/DL, TDD configurations defined so far in 3GPP. For each subframe in a radio frame, "D" denotes the subframe is reserved for downlink transmissions, "U" denotes the subframe is reserved for uplink transmissions, and "S" denotes a special subframe with the three fields downlink pilot time slot (DwPTS), TDD guard period (GP), and uplink pilot time slot (UpPTS). Choosing a specific UL/DL configuration may be determined, for example, by traffic demand in DL and/or UL and network capacity in DL and/or UL.

As shown in FIG. 3, subframes 0 and 5 and DwPTS are reserved for downlink transmission. UpPTS and the subframe immediately following the special subframe are reserved for uplink transmission. The length of DwPTS and UpPTS depends on the combination of DL and UL cyclic prefix lengths and on the special subframe configuration (10 pre-defined special subframe configurations are defined in TS 36.211). Typically, DwPTS is longer than UpPTS.

In case multiple cells are aggregated, the UE may assume that the guard period of the special subframe in the different cells have an overlap of at least 1456·Ts.

A UE may need to perform simultaneous transmission/reception in a TDD system in an inter-band scenario, an inter-frequency scenario, or an intra-frequency scenario:

Inter-band scenario, i.e., when an UL subframe/slot/UpPTS is configured in at least one cell on a carrier frequency in one band and a DL subframe/slot/DwPTS is configured in at least one cell on another carrier frequency in another band, wherein the UL and DL subframe/slot or other signals configured on different cells of different carriers in different bands at least partly overlap in time, Inter-frequency scenario, i.e., when an UL subframe/slot/UpPTS is configured in at least one cell on one carrier frequency and a DL subframe/slot/DwPTS is configured in at least one cell on another carrier frequency, where the carrier frequencies belong to the same frequency band, wherein the UL and DL subframe/slot or other signals configured on different cells of different carriers in the same band at least partly overlap in time, Intra-frequency scenario, i.e., when an UL subframe/slot/UpPTS is configured in one cell and a DL subframe/slot/DwPTS is configured in another cell on the same carrier frequency, wherein the UL and DL subframe/slot or other signals configured on different cells of the same carrier at least partly overlap in time, The different configurations may occur statically, semi-statically (e.g., with inter-band CA), or dynamically (e.g., with dynamic TDD).

The different carriers in the same or different bands mentioned in above scenarios may also belong to multicarrier configuration of the UE e.g., f1 and f2 may be PCC and SCC of the UE.

It may be resource and complexity demanding to require that all UEs are capable of simultaneous transmission and reception. Therefore, to address this issue for the inter-band scenario, 3GPP has specified the following UE capability in TS 36.331 (Rel-11).

```
BandCombinationParameters-V1130 :: = SEQUENCE {
        multipleTimingAdvance-r11    ENUMERATED {supported}    OPTIONAL,
        simultaneousRx-Tx-r11        ENUMERATED {supported}    OPTIONAL,
        bandParameterList-r11        SEQUENCE (SIZE (1..maxSimultaneousBands-r10)) OF
BandParameters-V1130         OPTIONAL,
        ...
}
```

According to TS 36.331 (Rel-11), simultaneous Rx-Tx indicates whether the UE supports simultaneous reception and transmission on different bands for each band combination listed in supportedBandCombination. This field is only applicable for inter-band TDD carrier aggregation.

According to TS 36.306 (Rel-11), section 4.3.5.4, the simultaneous Rx-Tx field defines whether the UE supports simultaneous reception and transmission for inter-band TDD carrier aggregation.

SUMMARY

Disclosed is a method in a radio node. The method comprises determining a first uplink-downlink, UL-DL, configuration used in a first cell, determining a second uplink-downlink, UL-DL, configuration used in a second cell, and determining that the first UL-DL configuration and the second UL-DL configuration are different during an at least partly overlapping time period. The method comprises adapting at least one of a measurement configuration for performing a measurement in at least one of the first cell and the second cell, scheduling transmission of signals at the radio node in at least one of the first cell and the second cell, and scheduling reception of signals at the radio node in at least one of the first cell and the second cell.

Also disclosed is a radio node. The radio node determines a first uplink-downlink, UL-DL, configuration used in a first cell, determines a second uplink-downlink, UL-DL, configuration used in a second cell, and determines that the first UL-DL configuration and the second UL-DL configuration are different during an at least partly overlapping time period. The radio node adapts at least one of a measurement configuration for performing a measurement in at least one of the first cell and the second cell, scheduling transmission of signals at the radio node in at least one of the first cell and the second cell, and scheduling reception of signals at the radio node in at least one of the first cell and the second cell. In certain embodiments, the radio node includes a processing means for performing functionality of the radio node. In certain embodiments, the processing means comprises a processor and a memory that contains instructions executable by said processor.

Further disclosed is a method in a network node. The method comprises determining a first uplink-downlink, UL-DL, configuration used in a first cell, determining a second uplink-downlink, UL-DL, configuration used in a second cell, and determining that the first UL-DL configuration and the second UL-DL configuration are different during an at least partly overlapping time period. The method further comprises adapting, in at least one of the first cell and the second cell, at least one of: a measurement configuration for performing a measurement by the network node or for performing a measurement by the radio node, scheduling of the network node's transmission of signals to the radio node, and scheduling of the network node's reception of signals from the radio node.

Also disclosed is a network node. The network node determines a first uplink-downlink, UL-DL, configuration used in a first cell, determines a second uplink-downlink, UL-DL, configuration used in a second cell, and determines that the first UL-DL configuration and the second UL-DL configuration are different during an at least partly overlapping time period. The network adapts, in at least one of the first cell and the second cell, at least one of: a measurement configuration for performing a measurement by the network node or for performing a measurement by the radio node, scheduling of the network node's transmission of signals to the radio node, and scheduling of the network node's reception of signals from the radio node. In certain embodiments, the network node includes a processing means for performing functionality of the network node. In certain embodiments, the processing means comprises a processor and a memory that contains instructions executable by said processor.

In certain embodiments, the first UL-DL configuration and the second UL-DL configuration are different when the first UL-DL configuration comprises at least part of a UL configuration during the overlapping time period, the second UL-DL configuration comprises at least part of a DL configuration during the overlapping time period, and the part of the UL configuration overlaps at least in part with the part of the DL configuration during the overlapping time period.

In certain embodiments, the radio node is not capable of simultaneous transmit and receive operations when the first UL-DL configuration and the second UL-DL configuration are different.

Adapting the measurement configuration may comprise one or more of: not performing the measurement during the overlapping time period, performing the measurement but not transmitting during the overlapping time period, performing the measurement during the overlapping time period at least in pre-defined resources, and performing the measurement during the overlapping time period provided a certain condition is met.

In certain embodiments, adapting the measurement configuration comprises measuring (230) a reference signal time difference, RSTD, provided that the radio node is not scheduled in at least certain UL subframes of the second cell that partly or fully overlap in time with at least a certain number of positioning subframes of the first cell required for performing the RSTD measurement. The certain number of positioning subframes is 6 subframes for 1.4 MHz and 3 MHz; 2 subframes for 5 MHz; or 1 subframe for 10 MHz or larger.

In certain embodiments, adapting the measurement configuration comprises measuring a UE Rx-Tx time difference measurement provided that the UE is not scheduled in UL subframes of the second cell that partly or fully overlap in time with DL subframes of the first cell used for DL measurement and the UE is not scheduled in DL subframes of the second cell that partly or fully overlap in time with UL subframes of the first cell used for UL measurement.

In certain embodiments, the radio node is a UE and adapting the measurement configuration comprises measuring one or more RRM measurements provided that the UE is not scheduled in at least certain UL subframes of the second cell that partly or fully overlap in time with at least DL subframe #0 of the first cell required for performing the one or more RRM measurements or the UE is not scheduled in at least certain UL subframes of the second cell that partly or fully overlap in time with at least DL subframe #5 of the first cell required for performing the one or more RRM measurements.

An example of adapting the scheduling of the radio node transmission includes dropping a transmission scheduled during the overlapping time period. Other examples of adapting the scheduling of the radio node transmission include not transmitting during the overlapping time period and/or delaying a transmission scheduled during the overlapping time period. Thus, adapting the scheduling of the radio node may include any one or more of dropping a transmission scheduled during the overlapping time period, not transmitting during the overlapping time period, and/or delaying a transmission scheduled during the overlapping time period.

Examples of adapting the scheduling of the radio node reception may comprise any one or more of: not receiving during the overlapping time period, and delaying or dropping a reception scheduled during the overlapping time period. Further examples of adapting the scheduling include: not scheduling in the first cell's UL subframes that partly or fully overlap in time with at least one of the second cell's DL subframes per time period, and not scheduling in the first cell's DL subframes that partly or fully overlap in time with at least one of the second cell's UL subframes per time period. In certain embodiments, the time period can be a radio frame, measurement time, L1 measurement period, or cell identification time.

BRIEF DESCRIPTION OF THE DRAWINGS

FIG. 3 is a table showing an example of uplink/downlink TDD configurations defined so far in 3GPP.

FIGS. 7A-7B are block diagrams illustrating example components of wireless device, such as a UE, in accordance with certain embodiments of the disclosure.

DETAILED DESCRIPTION

In a wireless network, a radio node may communicate with one or more radio network nodes to transmit and/or receive voice traffic, data traffic, control signals, and so on. Embodiments of the present disclosure may facilitate controlling simultaneous transmission/reception of a radio node in a TDD system. Particular embodiments are described with respect to the following figures, like numerals being used for like and corresponding parts of the various drawings.

Figure 4:
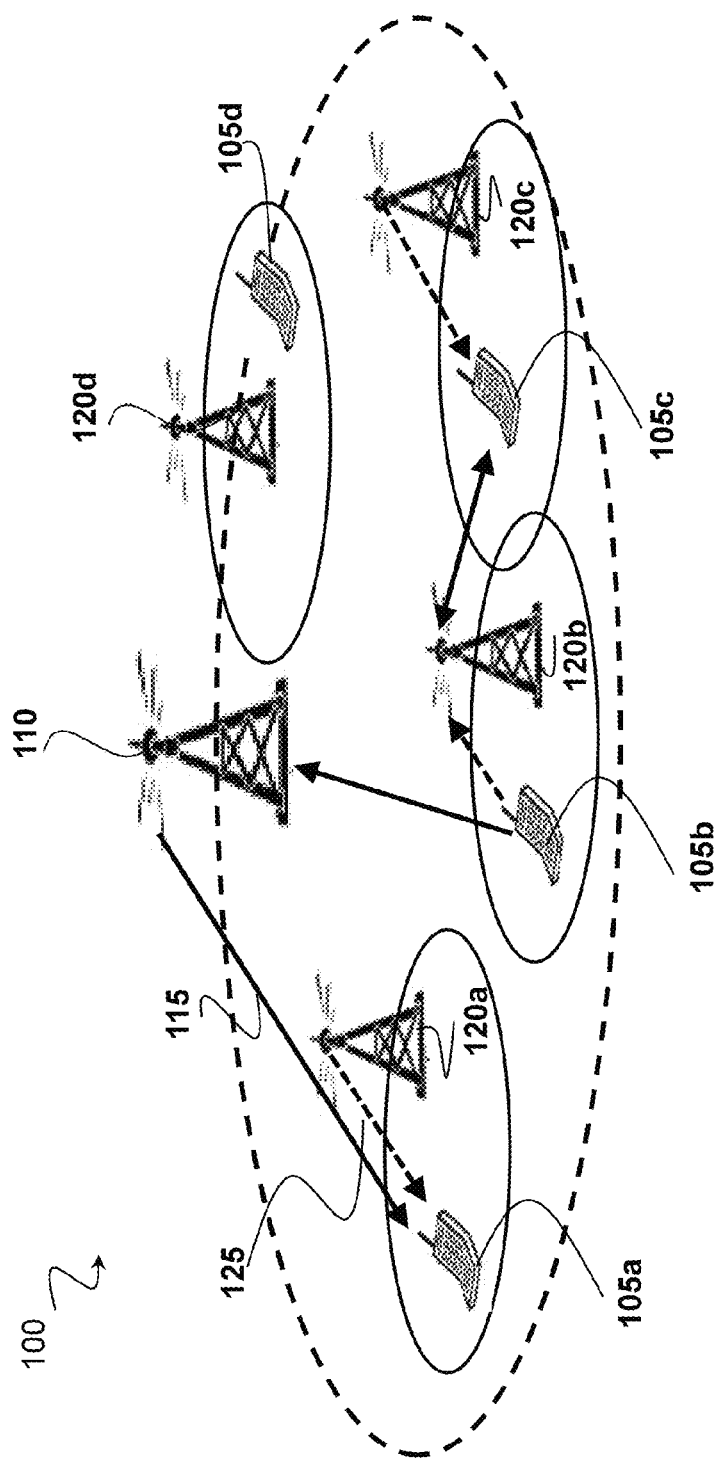
FIG. 4 is a block diagram illustrating an example embodiment of a network, in accordance with certain embodiments of the disclosure.

FIG. 4 is a block diagram illustrating embodiments of a network 100 comprising a plurality of radio nodes 105 and a plurality of cells, such as a first cell 110 and a second cell 120a. Radio node 105 may comprise user equipment/UE (such as a laptop, mobile telephone, or tablet device) or a radio network node (such as a femto base station, home base station, or eNodeB) and may receive a first signal 115 from first cell 110 and second signal 125 from second cell 120a. Radio node 105 may perform radio measurements with respect to first cell 110/first signal 115 and/or second cell 120a/second signal 125 to support different functions such as mobility (e.g., cell selection, handover, etc.), positioning a UE, link adaption, scheduling, load balancing, admission control, interference management, interference mitigation, etc. Examples of such measurements are SNR, SINR, received interference power (RIP), BLER, propagation delay between UE and itself, transmit carrier power, transmit power of specific signals (e.g., Tx power of reference signals), positioning measurements, etc.

In FIG. 4, each network node (including first cell 110 and second cell 120a) may use any suitable radio access technology, such as long term evolution (LTE), LTE-Advanced, UMTS, HSPA, GSM, cdma2000, WiMax, WiFi, and/or other suitable radio access technology. The network may include any suitable combination of one or more radio access technologies. For purposes of example, various embodiments may be described within the context of certain radio access technologies. However, the scope of the disclosure is not limited to the examples and other embodiments could use different radio access technologies. In addition, the network nodes may be deployed throughout the network a homogenous deployment, heterogeneous deployment, or mixed deployment. A homogeneous deployment may generally describe a deployment made up of the same (or similar) type of radio network nodes and/or similar coverage and cell sizes and inter-site distances. A heterogeneous deployment may generally describe deployments using a variety of types of radio network nodes having different cell sizes, transmit powers, capacities, and inter-site distances. For example, a heterogeneous deployment may include a plurality of low-power nodes placed throughout a macro-cell layout. Deploying low-power nodes throughout a macro-cell layout may extend capacity in certain traffic hotspots, however, the differences in the various nodes (such as differences in transmit power) may tend to increase the complexity of managing interference in the uplink and/or in the downlink as compared to a homogenous deployment. Mixed deployments may include a mix of homogenous portions and heterogeneous portions.

As shown by FIG. 4, an example network may include one or more wireless devices (e.g., radio node 105) and one or more radio network nodes (e.g., first cell 110, second cell 120a, etc.) capable of communicating with these wireless devices. The network may also include any additional elements suitable to support communication between wireless devices or between a wireless device and another communication device (such as a landline telephone). A wireless device may include any suitable combination of hardware and/or software. For example, in particular embodiments, a wireless device may include the components described with respect to FIGS. 7A-7B below. Similarly, a radio network node may include any suitable combination of hardware and/or software. For example, in particular embodiments, a radio access node may include the components described with respect to FIGS. 8A-8B below. Also, as shown in FIG. 4, the example network may include multiple different types of radio network nodes including, for example, macro cell nodes (e.g., base stations, eNodeBs), low-power nodes (e.g., pico-, femto-, or other micro-base stations, home eNodeBs), and relay nodes. Although FIG. 4 illustrates an embodiment in which radio node 105 corresponds to a wireless device (such as the wireless device shown in FIGS. 7A-7B, in other embodiments radio node 105 could be a radio network node (such as the radio network node shown in FIGS. 8A-8B).

Particular embodiments may provide solutions to problems that may be envisioned when different UL/DL subframe configurations occur in the intra-frequency, inter-frequency, and inter-band scenarios. Such problems may include one or more of the following: (1) not all UEs may be supporting simultaneous transmission/reception and not all network nodes may be aware of this, e.g., the simultaneous Tx-Rx capability was introduced in Rel-11 but there may be Rel-10 UEs and Rel-10 eNodeBs, and (2) a UE capable of simultaneous transmission/reception in CA may be currently not configured with CA and as a result the UE may be not able to perform simultaneous transmission/reception, unless it is configured with CA.

If the network does not properly account for the individual UE capability to support simultaneous transmission/reception, the UE without such capability may be unable to transmit some signals and/or channels that it is expected (e.g., scheduled) to transmit. Similarly, the UE without such capability may be unable to receive some signals and/or channels that it is expected (e.g., according to a pre-defined requirement) to receive or perform a measurement on. As a result, it will degrade its performance.

As a first example, to enable DL reception in certain subframe (say SB1) on f1, if the UE is not scheduled to transmit critical UL signals or schedule to transmit such signals in UL with reduced rate in the same subframe (SB1) on f2, then certain measurements relying on such UL signals will be degraded, e.g., measurements using SRS such as eNodeB Rx-Tx, UE Rx-Tx, SINR at eNode B, etc.

As a second example, to enable UL transmission in certain subframe (say SB1) on f1, if the UE is not scheduled to receive critical DL signals or schedule to transmit such signals in DL with reduced rate in the same subframe (SB1) on f2, then certain measurements/procedures relying on such DL signals will be degraded, e.g., measurements using CRS, etc.

Particular embodiments may provide a solution to one or more of these problems. In some embodiments, the network node may adapt its scheduling in a time resource (e.g., radio frame, subframe, slot, symbol, or time-domain pattern of time resources) on one or more serving cell(s) of the UE in order to enable the UE to perform measurement in at least partly overlapping time resource in the opposite direction in another cell. Some embodiments provide methods in a network node and radio node (e.g., UE) to adapt its measurement configuration for measuring in a time resource in a measured cell in order to ensure that measurement on the measured cell and scheduling in the serving cell don't occur in opposite directions during at least partly overlapping time. Particular embodiments may apply to some or all of the radio measurement types described above in the background section including, but not limited to, "UE measurements" and "radio network node measurements."

In general, one example method in a network node serving a UE may comprise the steps of determining that one or more UEs are not capable of simultaneous transmission/reception of signals on different cells, determining that different UL-DL configurations are used in at least two cells, and adapting a configuration (e.g., scheduling of data) on at least one cell to avoid or reduce simultaneous transmission and reception on different cells for the UE.

In general, one example method in a UE served by a network node may comprise the steps of optionally determining that the UE is not capable of simultaneous transmission/reception of signals on different cells, determining that different UL-DL configurations are used in at least two cells, adapting a measurement configuration (e.g., measurement sampling) for performing at least one measurement on at least one cell to avoid or reduce simultaneous transmission or reception of data on another cell (e.g., serving cell) in a direction which is opposite to the direction of the measurement.

Different UL/DL configurations may comprise, e.g., any one or more of:

In an inter-band scenario, an UL configuration in at least one cell on a carrier frequency in one band and a DL configuration in at least one cell on another carrier frequency in another band, wherein the UL and DL configuration in different cells of different carriers in different bands at least partly overlap in time, Inter-frequency scenario, an UL configuration in at least one cell on one carrier frequency and a DL configuration in at least one cell on another carrier frequency, where the carrier frequencies belong to the same frequency band, wherein the UL and DL configurations in different cells of different carriers in the same band at least partly overlap in time, and/or Intra-frequency scenario, an UL configuration in one cell and a DL configuration in another cell on the same carrier frequency, wherein the UL and DL configurations in different cells of the same carrier at least partly overlap in time.

One or both of the two different UL/DL configurations may occur statically, semi-statically (e.g., with inter-band CA), or dynamically (e.g., with dynamic TDD).

The different carriers in the same or different bands mentioned in above scenarios may also belong to multicarrier configuration of the UE, e.g., f1 and f2 may be PCC and SCC of the UE.

In the above, an UL configuration may comprise, e.g., one or more of UL subframe, UL slot, UpPTS, UL symbol, and/or any time period or time unit intended for transmissions by a UE.

In the above, a DL configuration may comprise, e.g., one or more of DL subframe, DL slot, DwPTS, DL symbol, and/or any time period or time unit intended for transmitting radio signals by a radio network node (e.g., eNodeB) and/or receiving radio signals by a UE.

The UL and DL configurations are different when they are overlapping in time, at least partly.

As indicated above, certain embodiments describe methods in a network node of adapting a configuration to enable operation of a wireless device that is not capable of simultaneous transmission/reception. Such embodiments may be combined in any way with embodiments described in other portions of the disclosure.

In some embodiments, the network node may be a base station, such as an eNodeB. The network node may be serving the UE or may be any network node capable of configuring the UE and/or the UE's serving cell(s) or neighbor cells. The examples described with reference to a UE may be generalized for a radio node. In some embodiments, the network node determines that there is at least N UEs (e.g., N=1, 2, . . . ; where N may be a pre-defined number or may be configured) not capable of simultaneous transmission/reception of signals on different cells, determines a configuration in one cell and a configuration in another cell, and, if the determined configurations are different, then adapts the configuration on at least one cell to avoid or reduce simultaneous transmission and reception for the at least one UE in another cell.

The adaptation may be performed for one or more UEs, and the adapted configuration may be the same or different for the different UEs. The adapted configuration may be further signaled to another node or to the UE.

The determination that the UE is not capable of simultaneous transmission/reception of signals on different cells may be based on one or more of the following: (1) obtaining a radio access capability message from the UE indicating that UE does not support simultaneous reception and transmission on different cells; the different cells may belong to any one or more of the same carrier, different carriers in the same band, or different carriers in different bands, (2)

information about the above UE capability received from another network node, e.g., neighboring network node, core network node, another UE, etc., (3) information about the above UE capability stored in the memory or based on historical information previous obtained or acquired, and/or (4) information about the above UE capability is obtained based on a pre-defined or by association (e.g., a certain UE category has always such capability).

The configurations can be determined on at least 2 cells based on stored information or configuration used in the last time resource (e.g., subframe, radio frame, slot, symbol, time-domain pattern, etc.)

The adapting may comprise, e.g., any one or more of: (1) avoiding configuring certain configurations, (2) changing a configuration, (3) configuring a configuration based on a pre-defined rule, (4) reversing the current configuration, (5) ensuring that configuration is in a specific direction e.g., DL subframe in two or more cells for certain subframes e.g., DL subframes #0 and #5, (6) avoiding loosing critical UL signals/channels, and/or (7) avoiding loosing critical DL signals/channels. The configuration may comprise one or more of: (a) cell configuration (e.g., UL/DL subframe configuration, special subframe configuration, flexible subframe configuration, cell timing configuration), (b) UE configuration (e.g., a CA configuration, duplex configuration, UE transmit timing configuration or timing advance), and/or (c) UE scheduling for DL and/or UL (e.g., data scheduling, reference signal transmission configuration, measurement configuration, measurement/scheduling pattern configuration, resources granted for UE transmission/reception). The adapting may also further take into account the current configuration. The adapting may be based on one or more pre-defined rules, e.g., such as described in the "Example Rules Section" below.

In one example of avoiding configuring certain configurations (Example 1), the network node may avoid configuring UL subframes on carrier frequency f1 overlapping in time with critical DL signals on carrier frequency f2, wherein critical DL signals are used by the UE for specific or critical radio operations such as performing radio measurements, acquisition of system information etc. [e.g., subframe #0, #5, or a DwPTS (i.e., when the UE is expected to receive critical DL signals/channels)]. More specifically, in certain embodiments (Example 1a), the network node may avoid scheduling UL traffic on f1 overlapping in time with critical DL signals on f2 [e.g., subframe #0, #5, or a DwPTS (i.e., when the UE is expected to receive critical DL signals/channels)]. In certain embodiments (Example 1b), the network node may avoid scheduling DL traffic which triggers UL transmissions (e.g., ACK/NCK) in UL subframes on f1 overlapping in time with critical DL signals on f2 [e.g., subframe #0, #5, or a DwPTS (i.e., when the UE is expected to receive critical DL signals/channels)]

In another example of avoiding configuring certain configurations (Example 2), the network node avoids configuring DL subframes on f1 overlapping in time with critical UL signals, wherein critical UL signals are used by the UE for specific or critical radio operations such as performing radio measurements, sending random access etc. [e.g., in UpPTS (i.e., when the UE is expected/configured to transmit something) on f2]. More specifically, in certain embodiments (Example 2a), the network node avoids scheduling DL traffic on f1 overlapping in time with critical UL signals [e.g., in UpPTS (i.e., when the UE is expected/configured to transmit something) on f2]. In certain embodiments (Example 2b), the network node avoids scheduling UL traffic which triggers DL transmissions (e.g., ACK/NCK) in UL subframes on f1 overlapping in time with critical UL signals [e.g., UpPTS (i.e., when the UE is expected/configured to transmit something) on f2].

As indicated above, certain embodiments describe methods in a radio node. Such embodiments may optionally be combined in any way with embodiments described in other portions of the disclosure, such as generalization portions or portions describing embodiments in a network node, portions describing example rules, etc. The radio node may be as described above. A specific example of the radio node is a UE. The examples described for a UE may be generalized for a radio node.

According to this part of the disclosure, a UE that is not capable of simultaneous transmission/reception: (1) determines that it is not capable of simultaneous transmission/reception of signals during at least partly overlapping time in different cells, e.g., PCell and SCell; (2) determines a first configuration (e.g., UL-DL subframe configuration, etc.) used or to be used on one cell and a second configuration used or to be used on another cell and, if the first and second configurations are different, then (3) the UE adapts its measurement procedure or measurement configuration (e.g., measurement sampling rate, measurement time) when performing one or more measurements on the measured cell while being scheduled in another cell in a direction opposite to the direction of performing the measurement(s) in the measured cell (e.g., scheduled to transmit in UL while performing measurements in DL) or adapting at least one configuration. The concept of adapting a configuration has a similar meaning in this section, which describes certain embodiments applicable to a UE, as was previously described above with reference to certain embodiments applicable to a network node.

The determination that the UE is not capable of simultaneous transmission/reception of signals during at least partly overlapping time in different cells may be made by retrieving from the UE memory the stored information related to its radio access capability.

The determination about the first and second configurations used in the at least two cells may be made by the UE by retrieving from the UE memory one or more of the following: the configuration information received from the network node and the configurations used by the UE for measuring and/or scheduling in the said two cells.

The adapting may be autonomously done by the UE. In some embodiments, the adapting may be based on one or more pre-defined rules, e.g., such as in the "Example Rules Section" below. The adapting may be performed to meet one or more pre-defined requirements. The pre-defined requirements may be for the UL, DL or both. Examples of requirements include DL measurement accuracy requirements, DL measurement time, minimum number of ACK/NACKs in UL in response to DL receptions, maximum allowed performance loss rate (such as UL and/or DL packet loss rate in serving cell), etc.

The adapting of the measurement procedure or the measurement configuration for performing measurement on at least one measured cell may be further based on or triggered in response to the determination that at least during partly overlapping time, the UE is scheduled or is expected to be scheduled on another cell in a direction, which is opposite to the direction in which the measurement is done or expected to be done in the measured cell.

Example Rules Section

This section provides examples of rules to facilitate the operation of a radio node that is not capable of simultaneous transmission/reception. The example rules may optionally be combined in any way with embodiments described in other portions of the disclosure, such as the generalizations or portions describing embodiments in a network node, portions describing embodiments in a radio node/UE, etc.

As described above, a UE is one specific example of a radio node. Although certain example rules are given for a UE, such rules may be generalized for any other radio node. The rules can be pre-defined in the standard or configured dynamically (e.g., based on the capabilities and/or current configuration). As an example, a standard may require both UE and the network node to comply with certain rules so that the UE performs measurements for meeting certain corresponding pre-defined requirements. Examples of requirements related to measurements are measurement time (e.g., L1 measurement period, cell identification delay, reporting delay, etc.), measurement accuracy, number of identified cells to measure, etc.

All these rules may be applicable to a UE that is not capable of simultaneous reception and transmission on different cells (e.g., different cells on different bands for each band combination listed in supportedBandCombination) and, when the UE is configured with different configurations (e.g., different TDD configurations or UL-DL subframe configurations) on at least two cells, which may belong to the same carrier or different carriers, which in turn may belong to the same or different bands.

The following are example rules for radio resource management, RRM, measurements. Similar rules may also apply for other measurement types, e.g., for positioning measurements. Particular embodiments may optionally include one or more of the following example rules:

A UE shall perform RRM measurements (e.g., cell search, RSRP/RSRQ, CGI reading) on a measured cell and meet corresponding requirements provided UE is not scheduled in any of serving cell's UL subframes (or scheduled in UL in subframes) which partly or fully overlaps in time with certain specific DL subframes (e.g., DL subframes #0, #5) of measured cell.

UE shall perform RRM measurements (e.g., cell search, RSRP/RSRQ, CGI reading) and meet corresponding requirements provided UE is not scheduled in any of serving cell's UL subframes (or scheduled in UL in subframes) which partly or fully overlaps in time with certain specific DL subframes (e.g., DL subframes #0, #5) of measured cell over the entire measurement time.

UE shall perform RRM measurements (e.g., cell search, RSRP/RSRQ, CGI reading) and meet corresponding requirements provided UE is not scheduled in any of serving cell's UL subframes (or scheduled in UL in subframes) which partly or fully overlaps in time with at least N DL subframes (e.g., N=2) per radio frame of measured cell.

UE shall perform RRM measurements (e.g., cell search, RSRP/RSRQ, CGI reading) and meet corresponding requirements provided UE is not scheduled in any serving cell's UL subframes (or scheduled in UL in subframes) which partly or fully overlaps in time with at least M DL subframes (e.g., M=10 for RSRP/RSRQ) per radio frame of measured cell over the entire measurement time.

UE shall perform RRM measurements (e.g., cell search, RSRP/RSRQ, CGI reading) and meet corresponding requirements provided UE is not scheduled at least in X UL subframes of all UL subframes in a first cell which partly or fully overlaps in time with DL subframes in a measured cell, which is different than the first cell. The first cell is typically the serving cell of the UE e.g., PCell, SCell etc.

UE shall perform RRM measurements (e.g., cell search, RSRP/RSRQ, CGI reading) and meet corresponding requirements provided UE is scheduled in at most Y UL subframes of all UL subframes in a first cell which partly or fully overlaps in time with DL subframes in a measured cell, which is different than the first cell e.g., PCell, SCell etc.

UE shall perform RRM measurements (e.g., cell search, RSRP/RSRQ, CGI reading) and meet corresponding requirements provided UE is not scheduled at least in M UL subframes of all UL subframes per radio frame or during a certain time interval in a first cell which partly or fully overlaps in time with DL subframes per radio frame or during a certain time interval in a measured cell, which is different than the first cell. The first cell is typically the serving cell of the UE e.g., PCell, SCell etc.

UE shall perform RRM measurements (e.g., cell search, RSRP/RSRQ, CGI reading) and meet corresponding requirements provided UE is scheduled in at most N UL subframes of all UL subframes per radio frame in a first cell which partly or fully overlaps in time with DL subframes per radio frame in a measured cell, which is different than the first cell e.g., PCell, SCell etc.

UE shall perform RRM measurements (e.g., cell search, RSRP/RSRQ, CGI reading) and meet corresponding requirements provided over certain time period (e.g., measurement time such as L1 period and/or cell identification delay) the following condition is met: UE is not scheduled at least in J UL subframes of all UL subframes in a first cell which partly or fully overlaps in time with DL subframes in a measured cell, which is different than the first cell. The first cell is typically the serving cell of the UE e.g., PCell, SCell etc.

UE shall perform RRM measurements (e.g., cell search, RSRP/RSRQ, CGI reading) and meet corresponding requirements provided over certain time period (e.g., measurement time such as L1 period and/or cell identification delay) the following condition is met: UE is scheduled in at most K UL subframes of all UL subframes in a first cell which partly or fully overlaps in time with DL subframes in a measured cell, which is different than the first cell e.g., PCell, SCell etc.

In all the above exemplary pre-defined rules the measured cell may be neighbour cell or another serving cell. The first or serving cell and measured cell may belong to or operate on: the same carrier frequency or different carrier frequencies, which in turn may belong to the same frequency band or different frequency bands.

The following are example rules for UE Rx-Tx time difference measurements. Particular embodiments may optionally include one or more of the example rules described in this section.

For example, for the UE which is a CA UE but can measure only on PCell:

UE configured with SCell shall perform UE Rx-Tx time difference measurement on PCell and meet corresponding requirements provided the following conditions are met (per every frame over L1 or over entire measurement time i.e., L1 period): (1) UE is not scheduled in SCell's UL subframes (or scheduled in UL in subframes) which partly or fully overlaps in time with certain specific DL subframes (e.g., DL subframes #0,

5) of PCell; and (2) UE is not scheduled in SCell's DL subframes (or scheduled in DL in subframes) which partly or fully overlaps in time with certain specific UL subframes (e.g., UL subframes with SRS or used for UL measurement) of PCell.

Yet another example of rule for the UE which is a CA UE but which can measure only on PCell is:

UE configured with SCell shall perform UE Rx-Tx time difference measurement on PCell and meet corresponding requirements provided the following conditions are met (per every frame over L1 or over entire measurement time i.e., L1 period): (1) UE is not scheduled in SCell's UL subframes (or scheduled in UL in subframes) which partly or fully overlaps in time with at least certain number of DL subframes (e.g., at least 1 DL subframe per radio frame or 5 DL subframes per L1 measurement period) of PCell; and (2) UE is not scheduled in SCell's DL subframes (or scheduled in DL in subframes) which partly or fully overlaps in time with certain number of UL subframes (e.g., at least 1 UL subframe per radio frame or 5 UL subframes per L1 measurement period) of PCell.

For the UE which is a CA UE and can also measurement on one or more SCells:

UE configured with SCell shall perform UE Rx-Tx time difference measurement on 2nd serving cell (e.g., PCell or SCell) and meet corresponding requirements provided the following conditions are met (per every frame over L1 or over entire measurement time i.e., L1 period): (1) UE is not scheduled in a 1st serving cell's UL subframes (or scheduled in UL in subframes) which partly or fully overlaps in time with certain specific DL subframes (e.g., DL subframes #0, #5) of a 2nd serving cell; and (2) UE is not scheduled in the 1st serving cell's DL subframes (or scheduled in DL in subframes) which partly or fully overlaps in time with certain specific UL subframes (e.g., UL subframes with SRS or used for UL measurement) of the 2nd serving cell.

Yet another example of rule for the UE which is a CA UE and can also measurement on one or more SCells:

UE configured with SCell shall perform UE Rx-Tx time difference measurement on 2nd serving cell (e.g., PCell or SCell) and meet corresponding requirements provided the following conditions are met (per every frame over L 1 or over entire measurement time i.e., L1 period): (1) UE is not scheduled in a 1st serving cell's UL subframes (or scheduled in UL in subframes) which partly or fully overlaps in time with certain number of DL subframes (e.g., at least 1 DL subframe per radio frame or 5 DL subframes per L1 measurement period) of a 2nd serving cell; and (2) UE is not scheduled in the 1st serving cell's DL subframes (or scheduled in DL in subframes) which partly or fully overlaps in time with certain number of UL subframes (e.g., at least 1 UL subframe per radio frame or 5 UL subframes per L1 measurement period) of the 2nd serving cell.

Here and in other parts of the disclosure, scheduling in DL may comprise e.g., configuring UE measurements or indicating DL transmissions the UE should receive or transmitting DL transmission to the UE.

In particular embodiments, an example rule for RSTD measurements may state that the UE shall perform RSTD measurement on a measured cell and meet corresponding requirements provided UE is not scheduled in any of serving cell's UL subframes (or scheduled in UL in subframes) which partly or fully overlaps in time with at least certain number of positioning subframes (e.g., 6 subframes for 1.4 MHz) of the measured cell in a positioning occasion. The measured cell can be a neighbor cell, a serving cell, or a reference cell.

The above mentioned pre-defined rules may require changes in the implementation of the network node and UE. One or more of the following changes or adaptation can be implemented in order to ensure compliance to one or more of the above rules. As one example, the UE adapts its measurement configuration or procedure. This may be realized by UE changing its sampling of measurement signals, for example, obtain samples only in subframes where there is no simultaneous transmission and reception of signals in different cells at the same time or partly overlapping time. As another example, the network node adapts its scheduling by delaying or avoiding scheduling in a cell on those subframes which partly or fully overlap with subframes in another cell used by the UE or expected to be used by the UE for doing one or more measurements.

Figure 5A:
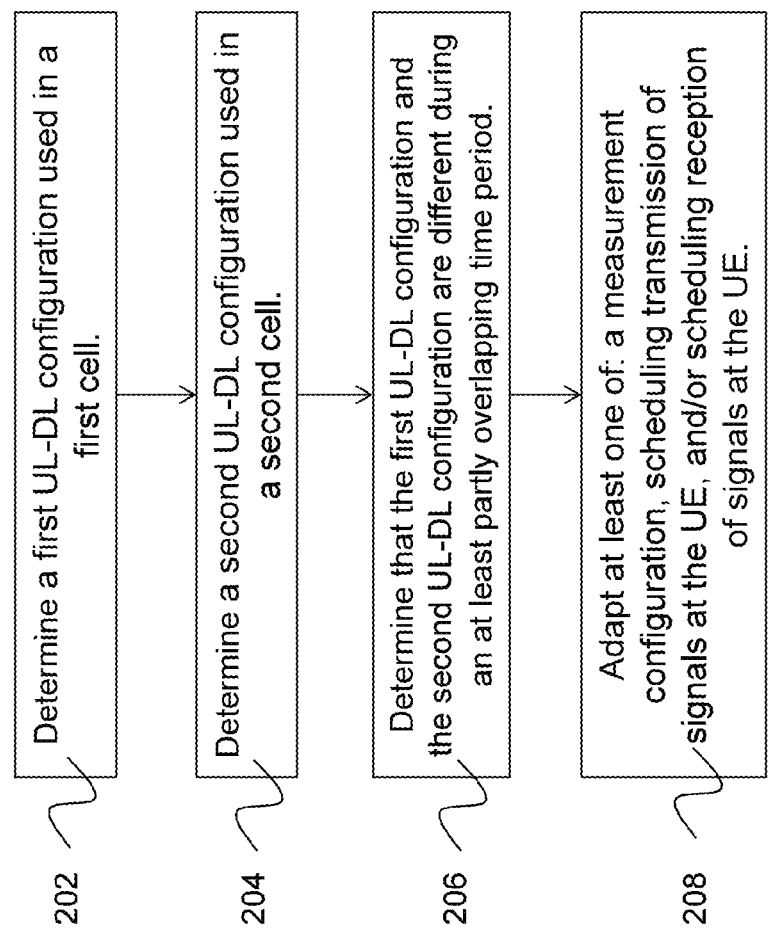
FIGS. 5A-5F are flow diagrams illustrating examples of methods in a user equipment, in accordance with certain embodiments of the disclosure.

Turning to FIGS. 5A-5F, these figures provide flow diagrams illustrating examples of methods in a UE 105. In particular, FIG. 5A illustrates a general overview of the method, and FIGS. 5B-5F illustrate various optional steps. Although the methods are described with respect to a UE 105, the methods may be generalized to any suitable radio node.

The method of FIG. 5A begins at step 202 where UE 105 determines a first uplink-downlink, UL-DL, configuration used in a first cell, such as a neighbor cell, a serving cell, or a reference cell. The first UL-DL configuration may comprise a UL configuration and/or a DL configuration. Examples of settings that can be configured in a UL configuration include UL subframe, UL slot, UL Pilot Time Slot (UpPTS), UL symbol, and/or any time period or time unit intended for transmissions by a transmitting UE. In certain embodiments, the transmitting UE may be UE 105 itself. In other embodiments, the transmitting UE may be another UE/radio node transmitting in the uplink. Examples of settings that can be configured in a DL configuration include DL subframe, DL slot, DL Pilot Time Slot (DwPTS), DL symbol, and/or any time period or time unit intended for transmitting radio signals by a radio network node and/or receiving radio signals by a receiving UE. In certain embodiments, the receiving UE may be UE 105 itself. In other embodiments, the receiving UE may be another UE/radio node receiving in the downlink.

At step 204, UE 105 determines a second uplink-downlink, UL-DL, configuration used in a second cell. The second cell may be a neighbor cell, a serving cell, or a reference cell. The second UL-DL configuration may comprise a UL configuration and/or a DL configuration.

At step 206, UE 105 determines that the first UL-DL configuration and the second UL-DL configuration are different during an at least partly overlapping time period. Any suitable time period may be used. As an example, the time period could be a subframe. In certain embodiments, UE 105 is not capable of simultaneous transmit and receive operations when the first UL-DL configuration and the second UL-DL configuration are different. As an example, the first UL-DL configuration and the second UL-DL configuration may be different if the first UL-DL configuration comprises at least part of the UL configuration during the overlapping time period, the second UL-DL configuration comprises at least part of the DL configuration during the overlapping time period, and the part of the UL configuration during the overlapping time period overlaps at least in part with the part of the DL configuration during the overlapping time period.

In response to determining that the first UL-DL configuration and the second UL-DL configuration are different during the overlapping time period, UE 105 performs an adapting step at step 208. More specifically, UE 105 adapts at least one of scheduling transmission of signals at the UE (e.g., UE 105 adapts the scheduling of its own transmission in one of the first cell and the second cell), scheduling reception of signals at the UE (e.g., UE 105 adapts the scheduling of its own reception in one of the first cell and the second cell), and/or a measurement configuration for performing a measurement in at least one of the first cell and the second cell. Examples of measurements that can be configured include an RRM measurement, a carrier aggregation measurement, a reference signal time difference (RSTD) measurement, and a UE receive-transmit (Rx-Tx) time difference measurement. In some embodiments, step 208 may be performed according to rules, such as any one or more of the rules described in the Example Rules Section above.

As a more specific example, in certain embodiments, adapting the measurement configuration comprises measuring a UE Rx-Tx time difference measurement provided that at least the following two criteria are met. The first criteria is that the UE is not scheduled in UL subframes of the second cell that partly or fully overlap in time with DL subframes of the first cell used for DL measurement. An example of DL subframes used for DL measurement is at least one DL subframe per radio frame of the first cell required for performing the UE Rx-Tx time difference measurement. The second criteria is that the UE is not scheduled in DL subframes of the second cell that partly or fully overlap in time with UL subframes of the first cell used for UL measurement. An example of UL subframes used for UL measurement is at least one UL subframe per radio frame of the first cell required for performing the UE Rx-Tx time difference measurement.

As another more specific example, in certain embodiments, adapting the measurement configuration comprises measuring one or more RRM measurements provided that: (1) the UE is not scheduled in at least certain UL subframes of the second cell that partly or fully overlap in time with at least DL subframe #0 of the first cell required for performing the one or more RRM measurements; or (2) the UE is not scheduled in at least certain UL subframes of the second cell that partly or fully overlap in time with at least DL subframe #5 of the first cell required for performing the one or more RRM measurements.

Figure 5B:
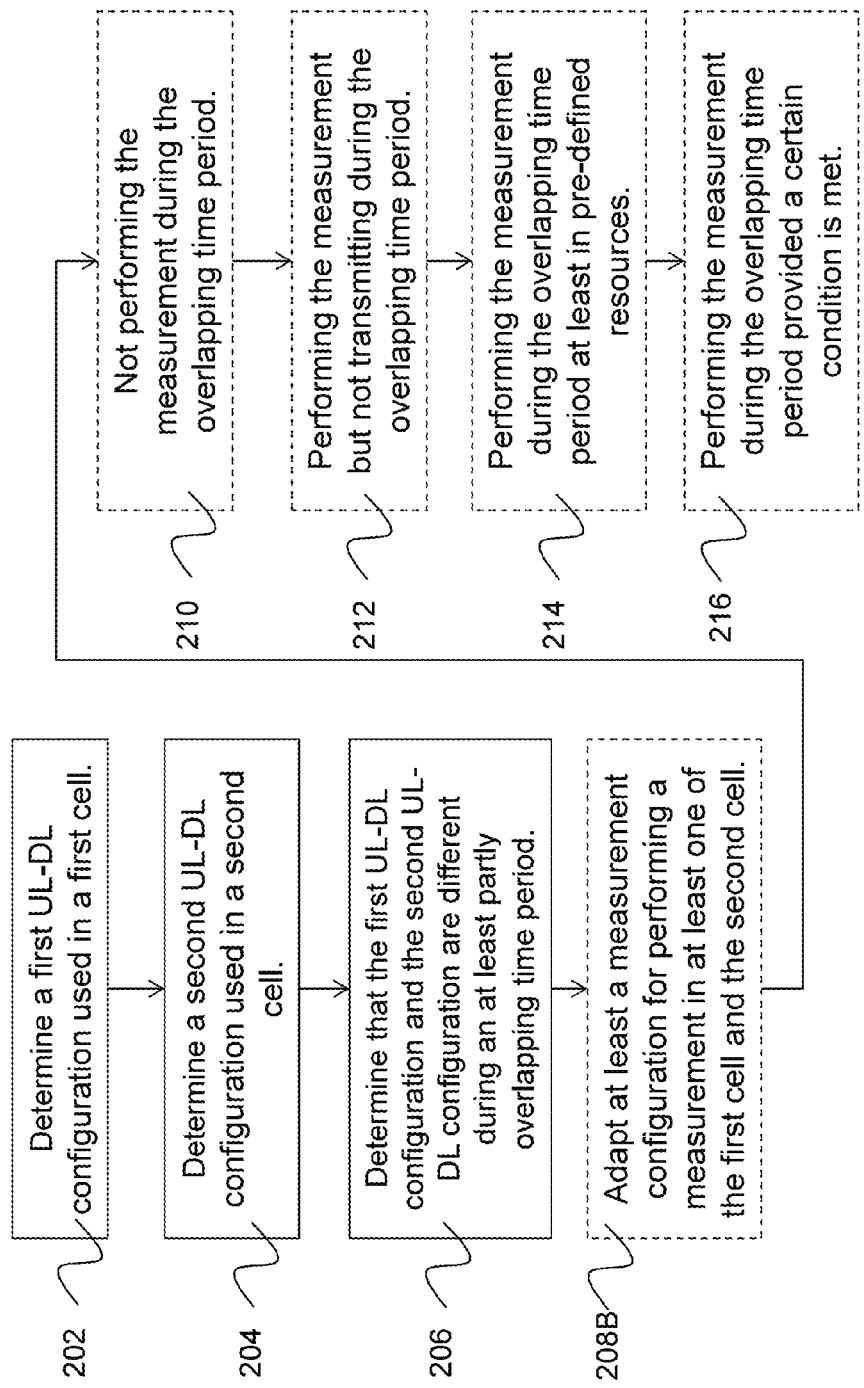

FIG. 5B illustrates additional/optional steps of the method described in FIG. 5A. Steps 202-206 are analogous in both figures. At step 208B of FIG. 5B, UE 105 adapts at least a measurement configuration for performing a measurement in at least one of the first cell and the second cell. UE 105 may optionally adapt scheduling transmission of signals at the UE and/or scheduling reception of signals at the UE as well. In response to adapting the measurement configuration, UE 105 may optionally perform any one or more of steps 210-216 of FIG. 5B. At step 210, UE 105 does not perform the measurement during the overlapping time period. At step 212, UE 105 performs the measurement but does not transmit during the overlapping time period. At step 214, UE 105 performs the measurement during the overlapping time period at least in pre-defined resources. As an example, the pre-defined resources could be subframe #0 and/or subframe #5. At step 216, UE 105 performs the measurement during the overlapping time period provided that a certain condition is met. As an example, the condition may be that one subframe is available per radio frame. As another example, the condition may be that all subframes are available during the positioning occasion.

Figure 5C:
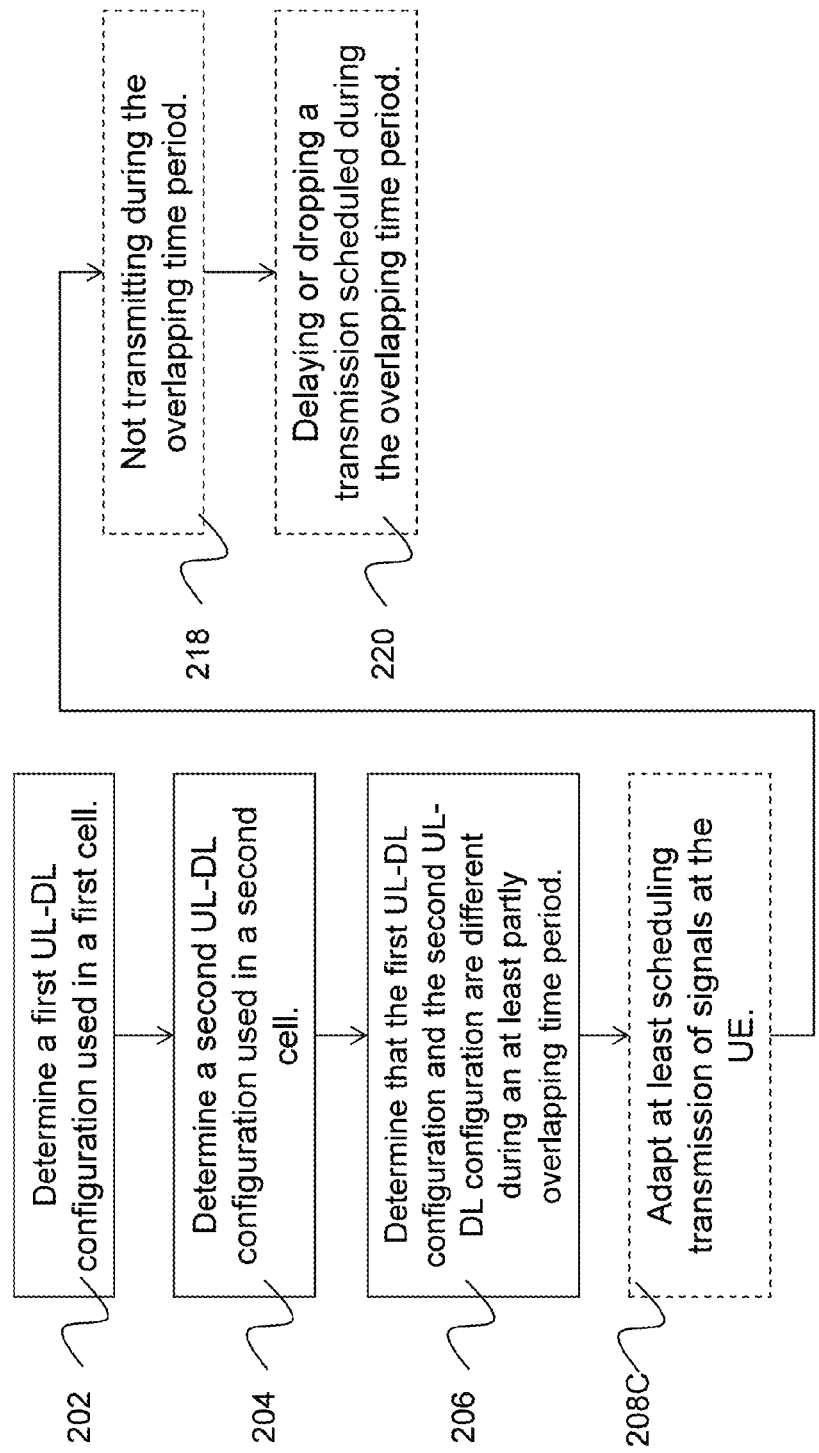

FIG. 5C illustrates additional/optional steps of the method described in FIG. 5A. Steps 202-206 are analogous in both figures. At step 208C of FIG. 5C, UE 105 adapts at least scheduling transmission of signals at the UE. UE 105 may optionally adapt scheduling reception of signals at the UE and/or a measurement configuration as well. UE 105 may optionally perform any one or more of steps 218-220 of FIG. 5C. At step 218, UE 105 does not transmit during the overlapping time period. At step 220, UE 105 delays or drops a transmission scheduled during the overlapping time period.

Thus, one embodiment of adapting the scheduling of the radio node transmission includes dropping a transmission scheduled during the overlapping time period. Another embodiment of adapting the scheduling of the radio node transmission includes not transmitting during the overlapping time period. Another embodiment of adapting the scheduling of the radio node includes delaying a transmission scheduled during the overlapping time period. In other embodiments, a combination of any two or all three of the preceding embodiments may be used.

Figure 5D:
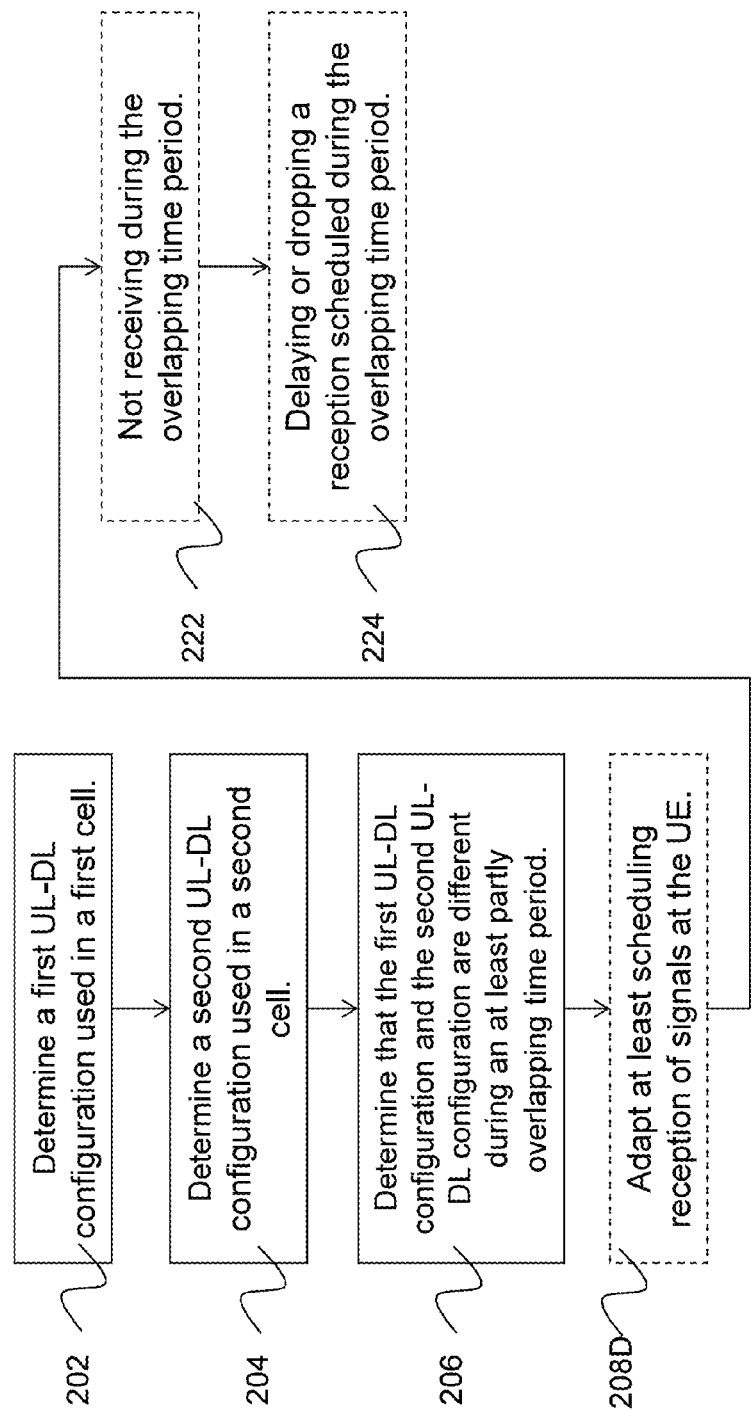

FIG. 5D illustrates additional/optional steps of the method described in FIG. 5A. Steps 202-206 are analogous in both figures. At step 208D of FIG. 5D, UE 105 adapts at least scheduling reception of signals at the UE. UE 105 may optionally adapt scheduling transmission of signals at the UE and/or a measurement configuration as well. UE 105 may optionally perform any one or more of steps 222-224 of FIG. 5D. At step 222, UE 105 does not receive during the overlapping time period. At step 224, UE 105 delays or drops a reception scheduled during the overlapping time period.

Figure 5E:
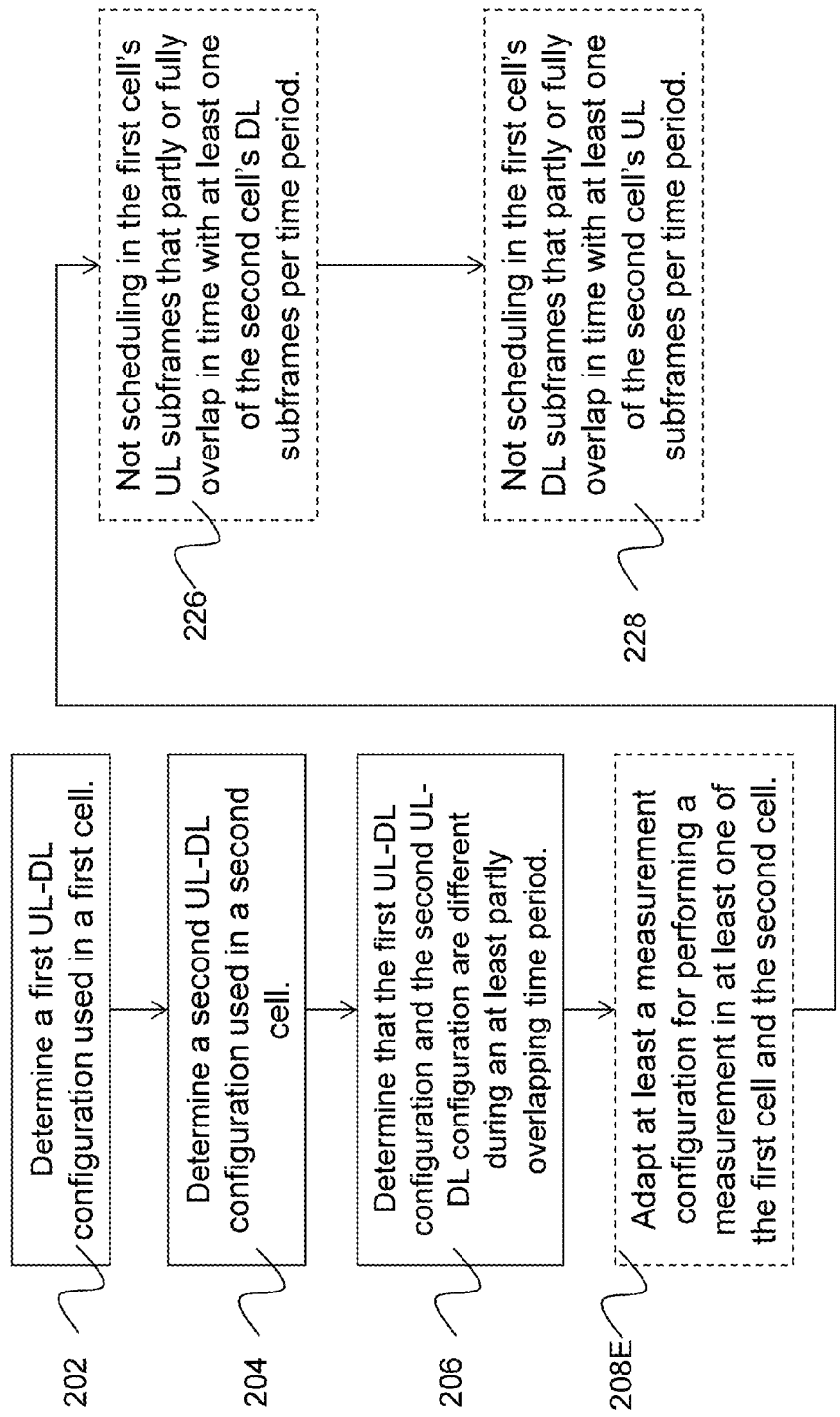

FIG. 5E illustrates additional/optional steps of the method described in FIG. 5A. Steps 202-206 are analogous in both figures. At step 208E of FIG. 5E, UE 105 adapts at least a measurement configuration for performing a measurement in at least one of the first cell and the second cell. UE 105 may optionally adapt scheduling transmission of signals at the UE and/or scheduling reception of signals at the UE as well. In response to adapting the measurement configuration, UE 105 may optionally perform any one or more of steps 226-228 of FIG. 5E. At step 226, UE 105 does not schedule in the first cell's UL subframes that partly or fully overlap in time with at least one of the second cell's DL subframes per a first time period. The first time period may correspond to a radio frame (e.g., 10 ms radio frame), a measurement time, an L1 measurement period, or a cell identification time. At step 228, UE 105 does not schedule in the first cell's DL subframes that partly or fully overlap in time with at least one of the second cell's UL subframes per a second time period. The second time period may correspond to a radio frame (e.g., 10 ms radio frame), a measurement time, an L1 measurement period, or a cell identification time, and the second time period may be the same as or different than the first time period.

Figure 5F:
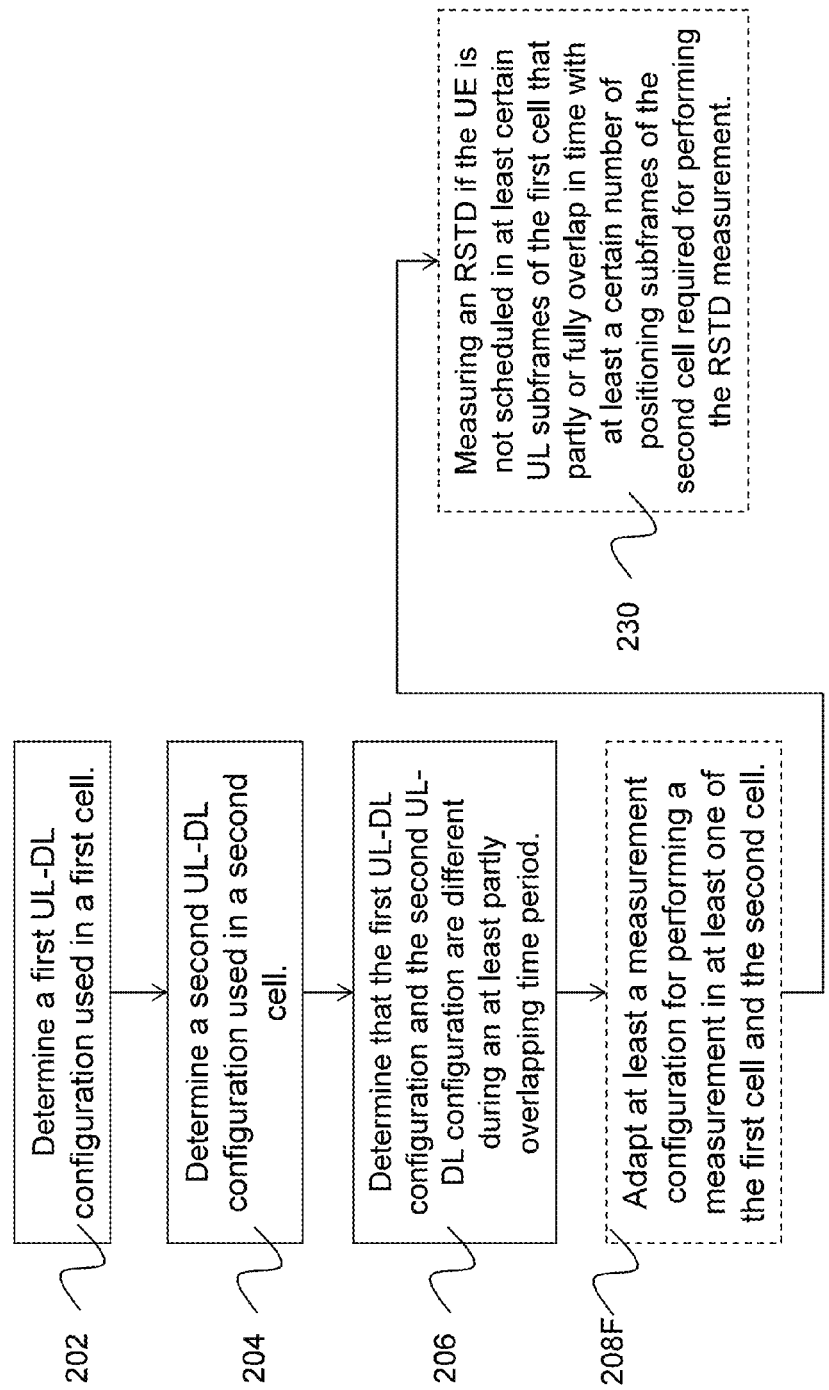

FIG. 5F illustrates additional/optional steps of the method described in FIG. 5A. Steps 202-206 are analogous in both figures. At step 208F of FIG. 5F, UE 105 adapts at least a measurement configuration for performing a measurement in at least one of the first cell and the second cell. UE 105 may optionally adapt scheduling transmission of signals at the UE and/or scheduling reception of signals at the UE as well. In response to adapting the measurement configuration, at optional step 230, UE 105 may measure an RSTD if the UE is not scheduled in at least certain UL subframes of the second cell that partly or fully overlap in time with at least a certain number of positioning subframes of the first cell required for performing the RSTD measurement. As examples, the certain number of positioning subframes may be 6 subframes for 1.4 MHz and 3 MHz; 2 subframes for 5 MHz; or 1 subframe for 10 MHz or larger.

In certain embodiments, examples of methods that may be performed in a UE/radio node may be summarized as follows: if UE 105 is scheduled to transmit or receive a transmission in a 1st subframe of a 1st cell, the UE 105 adapts the measurement configuration for performing measurement on a 2nd subframe in a 2nd cell, where the 2nd subframe overlaps at least partly in time with the 1st subframe. In certain embodiments, adapting the measurement configuration may include any of the following: not performing measurement in 2nd subframe if UE is scheduled in 1st subframe, and direction of both 1st and 2nd subframes are opposite; not performing measurement in 2nd subframe if direction of both 1st and 2nd subframes are opposite and regardless of whether UE is scheduled in 1st subframe or not; performing measurement in 2nd subframe if UE is scheduled in 1st subframe, and direction of both 1st and 2nd subframes are same; and/or not performing measurement in 2nd subframe if direction of both 1st and 2nd subframes are same and regardless of whether UE is scheduled in 1st subframe or not.

Figure 6A:
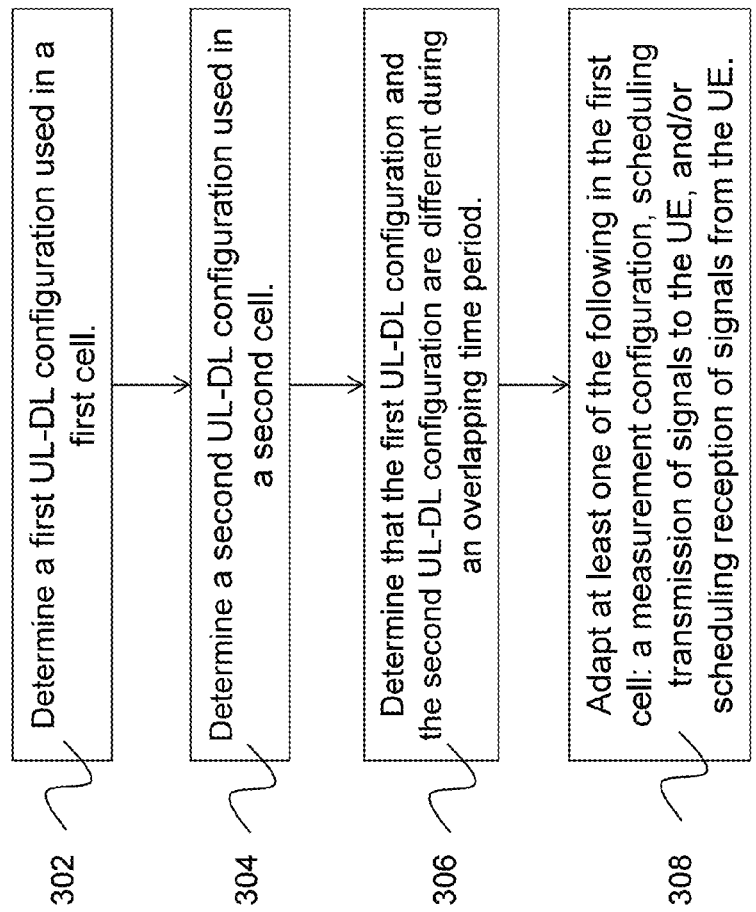
FIGS. 6A-6F are flow diagrams illustrating examples of methods in a network node, in accordance with certain embodiments of the disclosure.

Turning to FIGS. 6A-6F, these figures provide flow diagrams illustrating examples of methods in a network node (e.g., network node 110 or 120) serving a UE 105. In particular, FIG. 6A illustrates a general overview of the method, and FIGS. 6B-6F illustrate various optional steps. Although the methods are described with reference to a UE 105, the methods may be generalized to any suitable radio node.

The method of FIG. 6A begins at step 302 where network node 110/120 determines a first uplink-downlink, UL-DL, configuration used in a first cell. The first UL-DL configuration may comprise a UL configuration and/or a DL configuration. Examples of settings that can be configured in a UL configuration include UL subframe, UL slot, UL Pilot Time Slot (UpPTS), UL symbol, and/or any time period or time unit intended for transmissions by a transmitting UE. Examples of settings that can be configured in a DL configuration include DL subframe, DL slot, DL Pilot Time Slot (DwPTS), DL symbol, and/or any time period or time unit intended for transmitting radio signals by a radio network node and/or receiving radio signals by a receiving UE. At step 304, network node 110/120 determines a second uplink-downlink, UL-DL, configuration used in a second cell. The second UL-DL configuration may comprise a UL configuration and/or a DL configuration.

At step 306, network node 110/120 determines that the first UL-DL configuration and the second UL-DL configuration are different during an at least partly overlapping time period. Any suitable time period may be used. As an example, the time period could be a subframe. In certain embodiments, the first UL-DL configuration and the second UL-DL configuration are different when the UE 105 served by network node 110/120 is not capable of simultaneous transmit and receive operations. As an example, the first UL-DL configuration and the second UL-DL configuration may be different if the first UL-DL configuration comprises at least part of the UL configuration during the overlapping time period, the second UL-DL configuration comprises at least part of the DL configuration during the overlapping time period, and the part of the UL configuration during the overlapping time period overlaps at least in part with the part of the DL configuration during the overlapping time period.

In response to determining that the first UL-DL configuration and the second UL-DL configuration are different during the overlapping time period, network node 110/120 performs an adapting step at step 308. More specifically, in at least one of the first cell or the second cell, the network node 110/120 adapts at least one of a measurement configuration for performing a measurement by network node 110/120 or for performing a measurement by UE 105, scheduling of the network node's transmission of signals to UE 105, and scheduling of the network node's reception of signals from UE 105. Examples of measurements that can be configured include an RRM measurement, a carrier aggregation measurement, a reference signal time difference (RSTD) measurement, and a UE receive-transmit (Rx-Tx) time difference measurement. In some embodiments, step 308 may be performed according to rules, such as any one or more of the rules described in the Example Rules Section above.

As a more specific example, in certain embodiments, adapting the measurement configuration comprises adapting a UE Rx-Tx time difference measurement provided that at least the following two criteria are met. The first criteria is that the UE is not scheduled in UL subframes of the second cell that partly or fully overlap in time with DL subframes of the first cell used for DL measurement. An example of DL subframes used for DL measurement is at least one DL subframe per radio frame of the first cell required for performing the UE Rx-Tx time difference measurement. The second criteria is that the UE is not scheduled in DL subframes of the second cell that partly or fully overlap in time with UL subframes of the first cell used for UL measurement. An example of UL subframes used for UL measurement is at least one UL subframe per radio frame of the first cell required for performing the UE Rx-Tx time difference measurement.

As another more specific example, in certain embodiments, adapting the measurement configuration comprises adapting one or more RRM measurements provided that: (1) the UE is not scheduled in at least certain UL subframes of the second cell that partly or fully overlap in time with at least DL subframe #0 of the first cell required for performing the one or more RRM measurements; or (2) the UE is not scheduled in at least certain UL subframes of the second cell that partly or fully overlap in time with at least DL subframe #5 of the first cell required for performing the one or more RRM measurements.

Figure 6B:
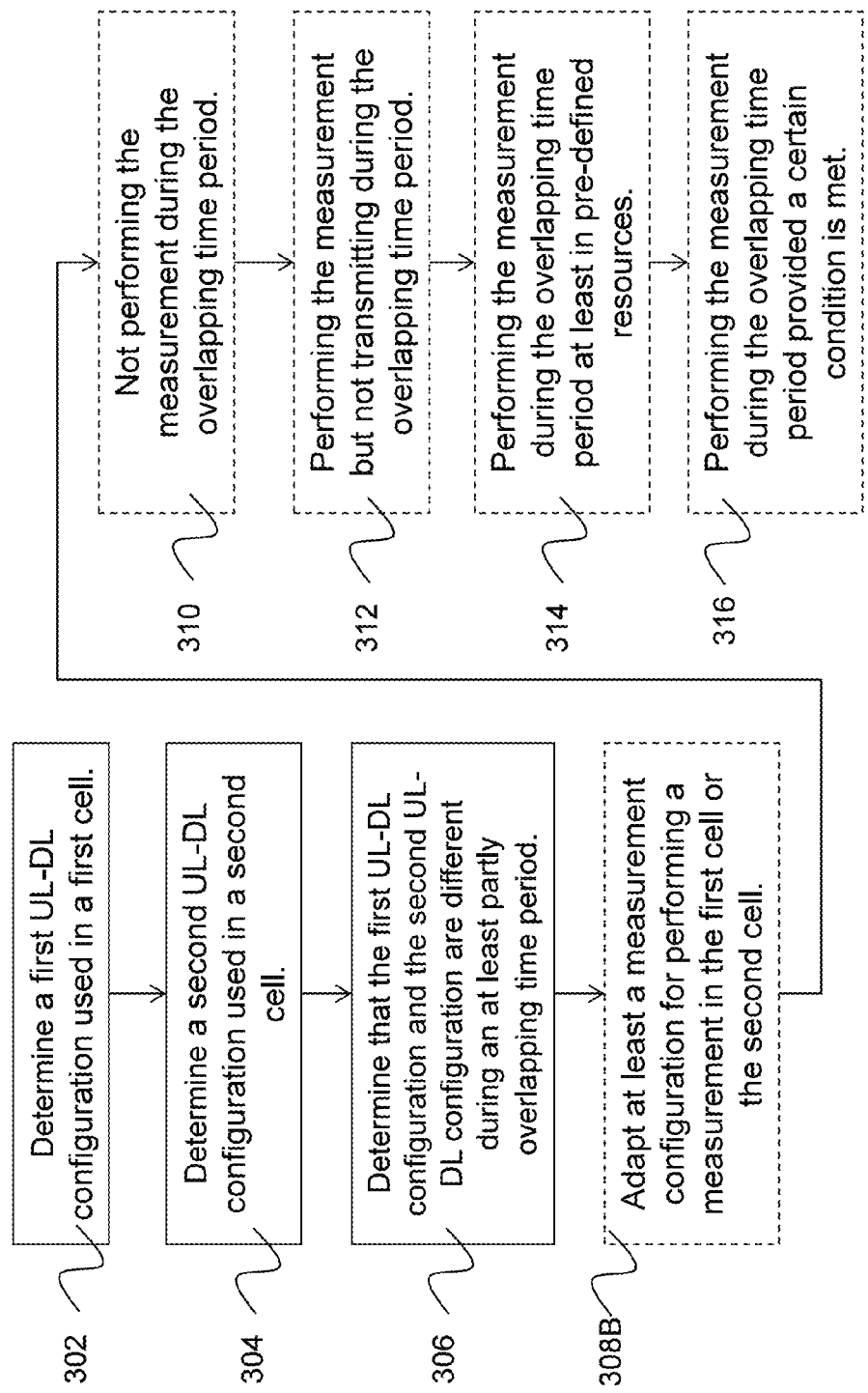

FIG. 6B illustrates additional/optional steps of the method described in FIG. 6A. Steps 302-306 are analogous in both figures. At step 308B of FIG. 3B, network node 110/120 adapts at least a measurement configuration for performing a measurement. Network node 110/120 may optionally adapt scheduling of the network node's transmission of signals to UE 105 and/or scheduling of the network node's reception of signals from UE 105 as well. In response to adapting the measurement configuration, network node 110/120 may optionally perform (or cause UE 105 to perform) any one or more of steps 310-316 of FIG. 6B. More specifically, the possible additional steps include not performing the measurement during the overlapping time period (step 310), performing the measurement but not transmitting during the overlapping time period (step 312), performing the measurement during the overlapping time period at least in pre-defined resources (e.g., subframe #0 and/or subframe #5, or other suitable pre-defined resources) (step 314), and performing the measurement during the overlapping time period provided that a certain condition is met (step 316). As an example, the condition may be that one subframe is available per radio frame. As another example, the condition may be that all subframes are available during the positioning occasion.

Figure 6C:
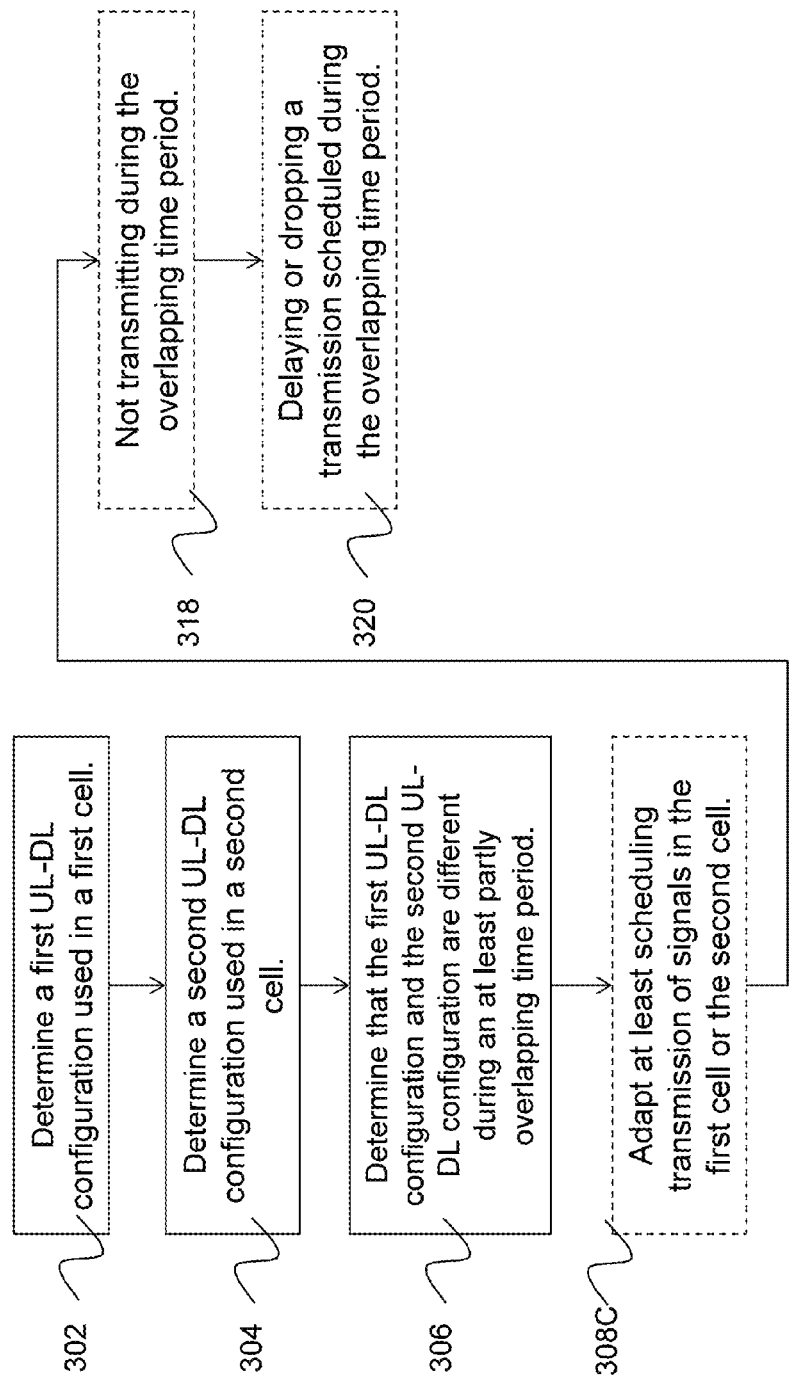

FIG. 6C illustrates additional/optional steps of the method described in FIG. 6A. Steps 302-306 are analogous in both figures. At step 308C of FIG. 6C, network node 110/120 adapts at least the scheduling of signal transmission. Network node 110/120 may optionally adapt the scheduling of signal reception and/or a measurement configuration as well. Network node 110/120 may optionally perform any one or more of steps 318-320 of FIG. 6C. At step 318, network node 110/120 does not transmit during the overlapping time period. At step 320, network node 110/120 delays or drops a transmission scheduled during the overlapping time period.

Thus, one embodiment of adapting the scheduling includes dropping a transmission scheduled during the overlapping time period. Another embodiment of adapting the scheduling includes not transmitting during the overlapping time period. Another embodiment of adapting the scheduling includes delaying a transmission scheduled during the overlapping time period. In other embodiments, a combination of any two or all three of the preceding embodiments may be used.

Figure 6D:
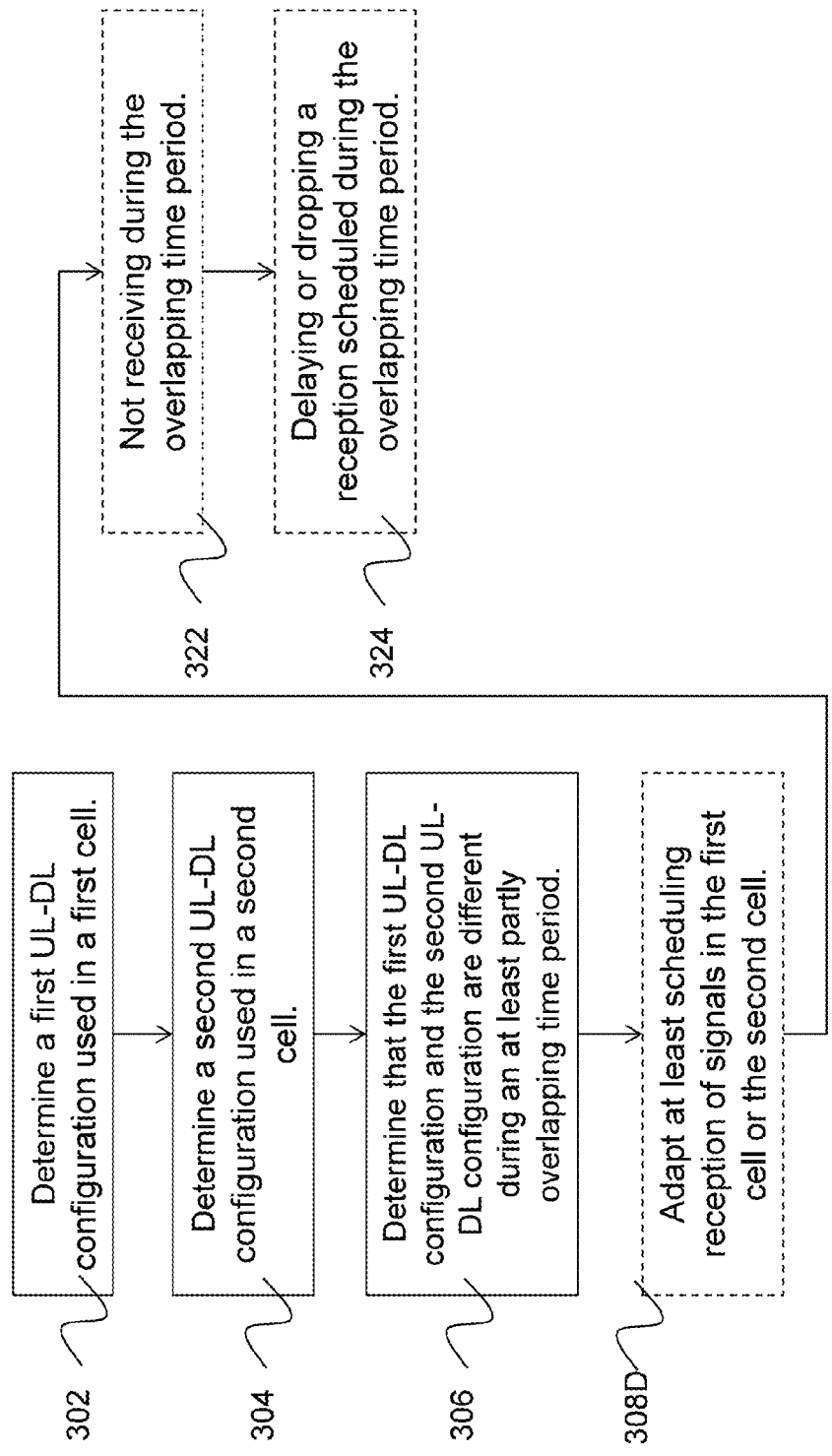

FIG. 6D illustrates additional/optional steps of the method described in FIG. 6A. Steps 302-306 are analogous in both figures. At step 308D of FIG. 6D, network node 110/120 adapts at least the scheduling of signal reception. Network node 110/120 may optionally adapt the scheduling of signal transmission and/or a measurement configuration as well. Network node 110/120 may optionally perform any one or more of steps 322-324 of FIG. 6D. At step 322, network node 110/120 does not receive during the overlapping time period. At step 324, network node 110/120 delays or drops a reception scheduled during the overlapping time period.

Figure 6E:
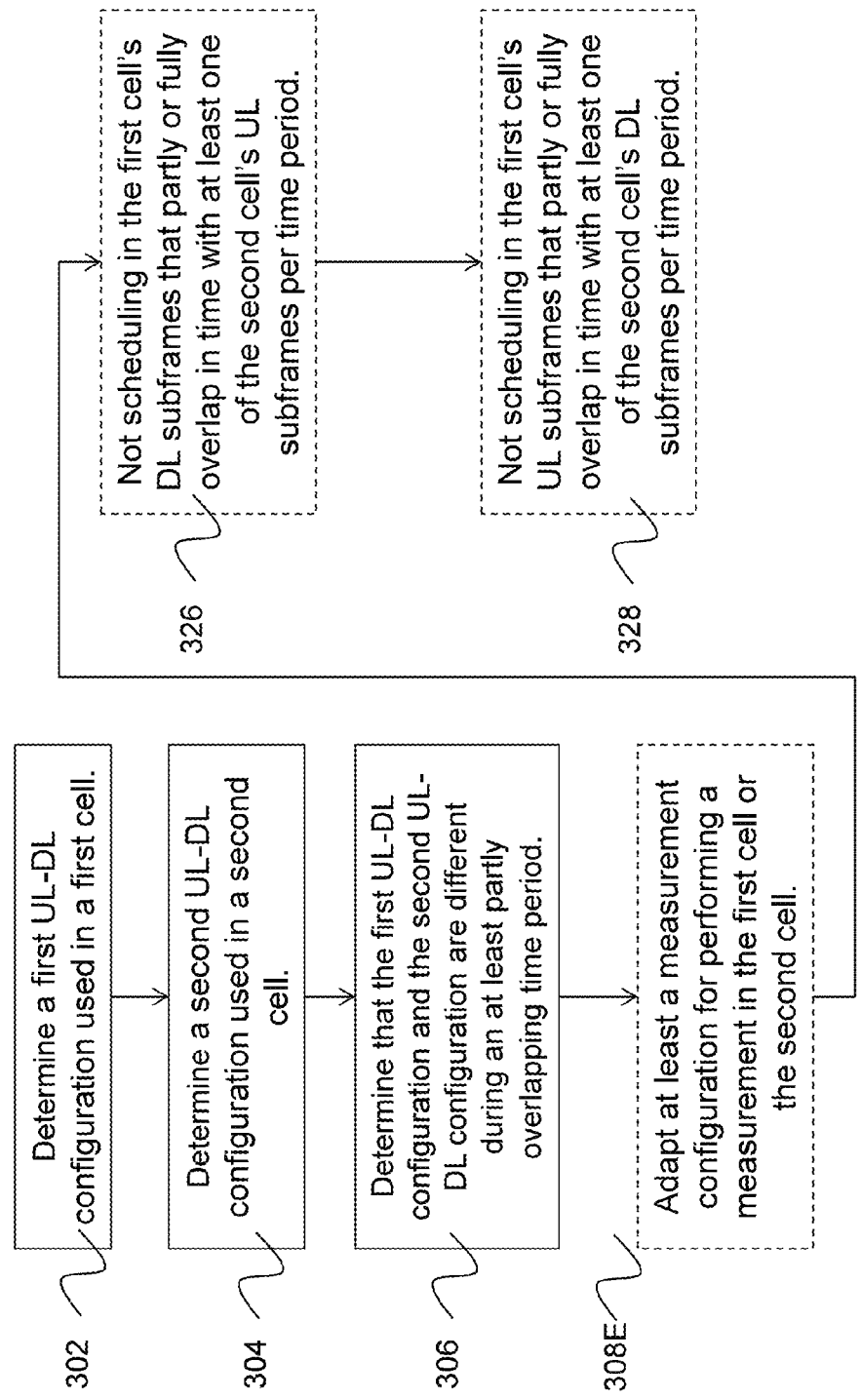

FIG. 6E illustrates additional/optional steps of the method described in FIG. 6A. Steps 302-306 are analogous in both figures. At step 308E of FIG. 6E, network node 110/120 adapts at least a measurement configuration for performing a measurement, by network node 110/120 or UE 105, in at least one of the first cell and the second cell. Network node 110/120 may optionally adapt the scheduling of signal transmission and/or the scheduling of signal reception as well. In response to adapting the measurement configuration, network node 110/120 may optionally perform (or cause UE 105 to perform) any one or more of steps 326-328 of FIG. 6E. In particular, step 326 describes not scheduling in the first cell's UL subframes that partly or fully overlap in time with at least one of the second cell's DL subframes per a first time period. The first time period may correspond to a radio frame (e.g., 10 ms radio frame), a measurement time, an L1 measurement period, or a cell identification time. Step 338 describes not scheduling in the first cell's DL subframes that partly or fully overlap in time with at least one of the second cell's UL subframes per a second time period. The second time period may correspond to a radio frame (e.g., 10 ms radio frame), a measurement time, an L1 measurement period, or a cell identification time, and the second time period may be the same as or different than the first time period.

Figure 6F:
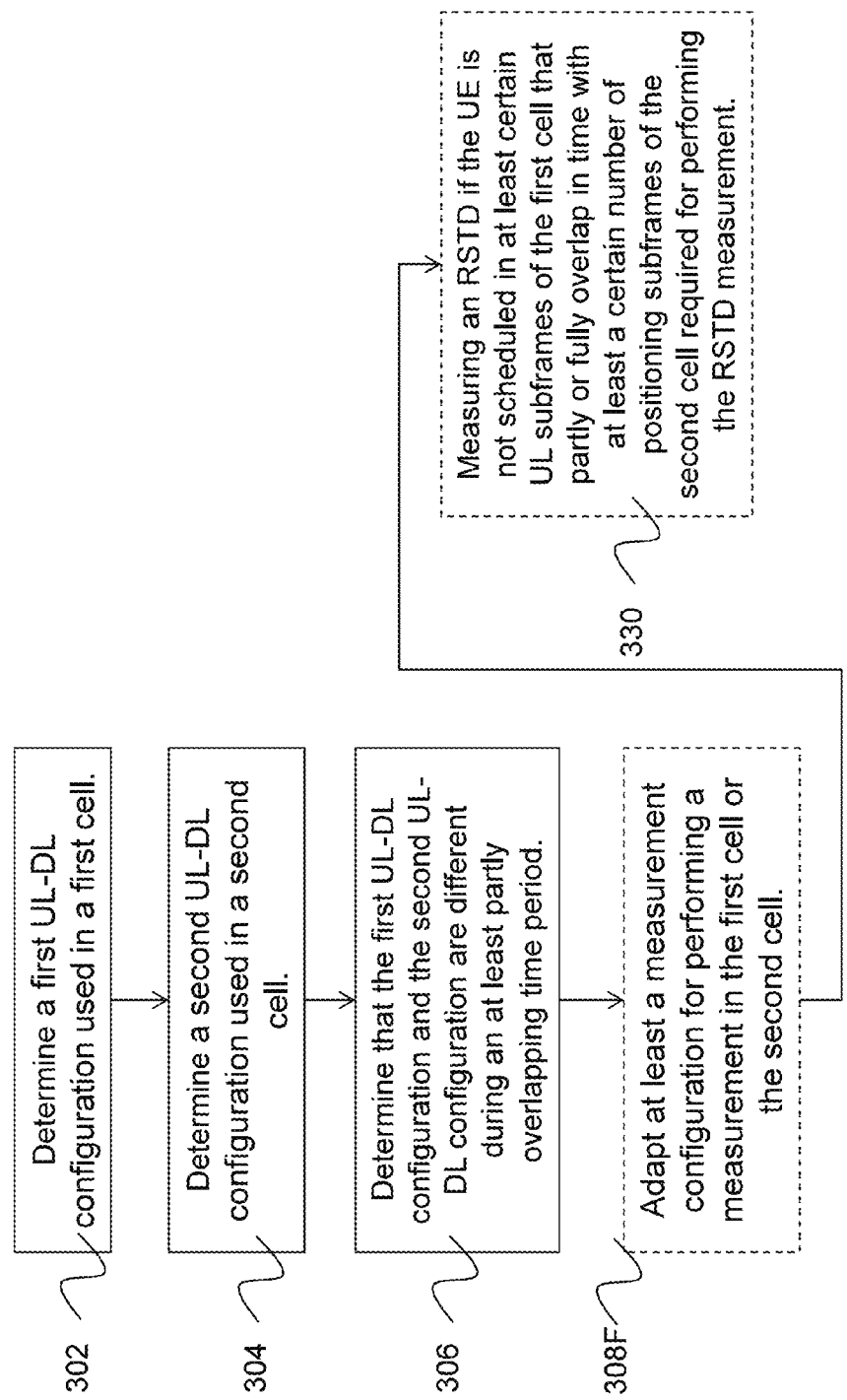

FIG. 6F illustrates additional/optional steps of the method described in FIG. 6A. Steps 302-306 are analogous in both figures. At step 308F of FIG. 6F, network node 110/120 adapts at least a measurement configuration for performing a measurement, by network node 110/120 or UE 105, in at least one of the first cell and the second cell. Network node 110/120 may optionally adapt the scheduling of signal transmission and/or the scheduling of signal reception as well. Step 330, RSTD is measured if UE 105 is not scheduled in at least certain UL subframes of the second cell that partly or fully overlap in time with at least a certain number of positioning subframes of the first cell required for performing the RSTD measurement. As examples, the certain number of positioning subframes may be 6 subframes for 1.4 MHz and 3 MHz; 2 subframes for 5 MHz; or 1 subframe for 10 MHz or larger.

In certain embodiments, examples of methods that may be performed in a network node may be summarized as follows: the network node determines a 1st UL-DL configuration used in a 1st cell; determines a 2nd UL-DL configuration used in at least one 2nd cell, determines at least one 2nd subframe of the 2nd cell, the 2nd subframe in which UE and/or network node performs a measurement in the 2nd cell; and adapts scheduling data to the UE in a 1st subframe in the 1st cell, where the 1st subframe that overlaps at least partly in time with the determined one 2nd subframe in the 2nd cell. Optional examples of adapting the scheduling could include not scheduling in 1st subframe if the direction of both 1st and 2nd subframes are opposite; scheduling in 1st subframe if the direction of both 1st and 2nd subframes are same; and/or scheduling in 1st subframe and in 2nd subframe, if the direction of both 1st and 2nd subframes are the same. Optionally, the first cell and the second cell are on the same frequency (e.g., intra-frequency) or the first cell and the second cell are on different frequencies (e.g., inter-frequency/inter-RAT). Optionally, the first cell is the serving cell of the UE. Optionally, the first cell and the second cell are PCell and SCell respectively or SCell and PCell respectively (CA).

FIG. 7A is a block diagram illustrating embodiments of a wireless device. Examples of the wireless device include a cellular UE, a mobile phone, a smart phone, a PDA (Personal Digital Assistant), a portable computer (e.g., laptop, tablet), a radio receiver, a sensor, a relay, a D2D relay, a small base station or radio network node, or other device that can provide wireless communication or employ a UE-like interface. A wireless device may also be referred to as radio node 105, user equipment (UE), a station (STA), or a terminal in some embodiments. UE in some embodiments herein, may comprise any entity capable of at least receiving or transmitting radio signals either via a direct link (e.g., between two UEs) or a link to a radio network or both. The wireless device comprises transceiver 710, processor 720, and memory 730. In some embodiments, transceiver 710 facilitates transmitting wireless signals to and receiving wireless signals from a radio network node (e.g., via an antenna), processor 720 executes instructions to provide some or all of the functionality described above as being provided by wireless devices, and memory 730 stores the instructions executed by processor 720.

Processor 720 may comprise any suitable combination of hardware and software implemented in one or more modules to execute instructions and manipulate data to perform some or all of the described functions of the wireless device. In some embodiments, processor 720 may include, for example, one or more computers, one or more central processing units (CPUs), one or more microprocessors, one or more applications, and/or other logic.

Memory 730 is generally operable to store instructions, such as a computer program, software, an application comprising one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Alternative embodiments of the wireless device may include additional components beyond those shown in FIG. 7A that may be responsible for providing certain aspects of the wireless device's functionality, including any of the functionality described herein and/or any additional functionality (including any functionality necessary to support the solution described herein).

FIG. 7B illustrates an example of components of wireless device, such as a UE/radio node 105, in accordance with certain embodiments of the disclosure. In particular, FIG. 7B illustrates a general processor unit 740 comprising an input module 750, a processor module 760, and an output module 770. In certain embodiments, a UL-DL configuration module of input module 750 receives information associated with a first uplink-downlink, UL-DL, configuration used in a first cell and a second uplink-downlink, UL-DL, configuration used in a second cell. Input module 750 communicates the information to processor module 760. A UL-DL configuration comparing module of processor module 760 determines that the first UL-DL configuration and the second UL-DL configuration are different during an overlapping time period. In response, a configuration adapter module of processor module 760 adapts at least one of: a measurement configuration for performing a measurement in at least one of the first cell and the second cell, scheduling transmission of signals at the UE, and scheduling reception of signals at the UE. In some embodiments, processor module 760 may then send the adapted configuration to output module 770, for example, so that a configuration communicator module of output module 770 can communicate the adapted configuration to be applied by the wireless device. In some embodiments, the modules described with respect to FIG. 7B may be implemented using one or more processors 720 described with respect to FIG. 7A.

Particular embodiments may apply to a UE (e.g., a wireless device/radio node 105) that does not support simultaneous reception and transmission on different cells may be scheduled data on any UL or DL subframe. If the UE is performing measurements on subframes whose direction is opposite to that of the subframes where it is being scheduled at the same time in another cell, then there will be severe degradation of measurement performance. This in turn will adversely affect procedures like mobility, positioning etc., which reply on UE measurements. Or the UE may start dropping transmissions and will thus degrade the service performance. Particular embodiments may solve this problem to ensure the measurements are done and meet the requirements (e.g., service performance requirements).

Figure 1:
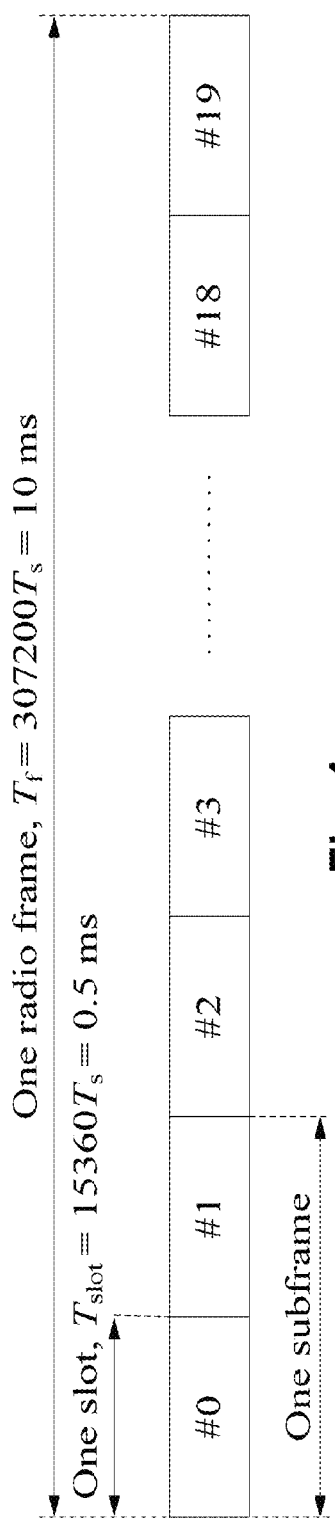
FIG. 1 is a diagram showing a frequency division duplex (FDD) radio frame structure supported by 3GPP.
Figure 2:
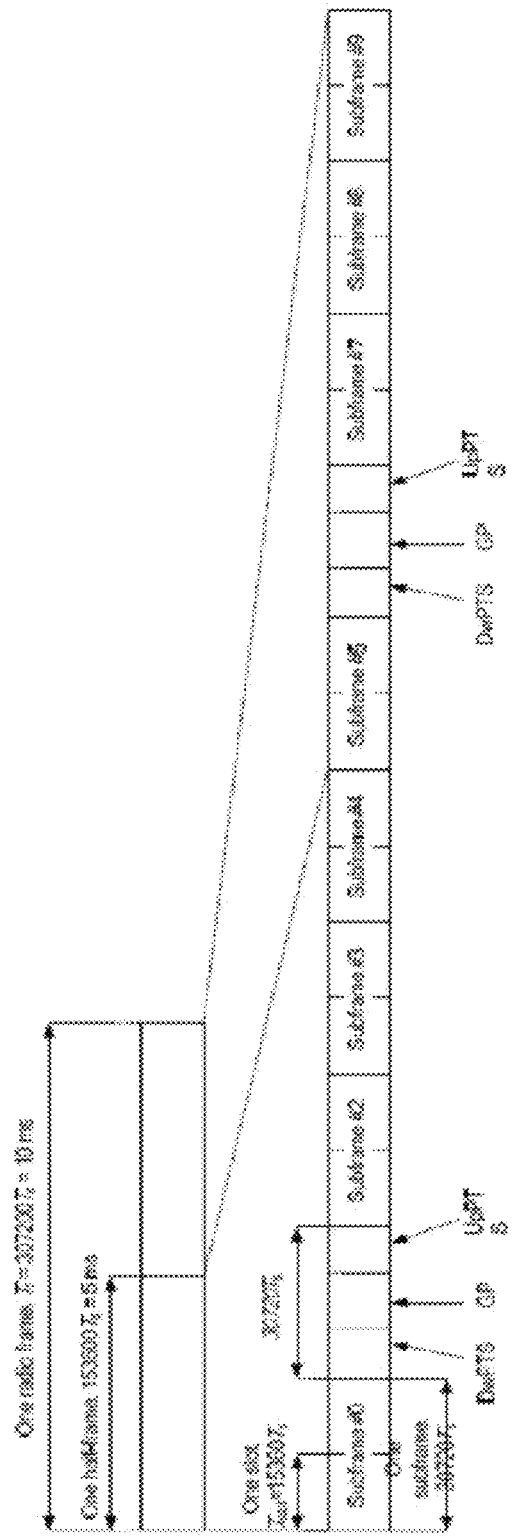
FIG. 2 is a diagram showing a time division duplex (TDD) radio frame structure supported by 3GPP.
Figure 8A:
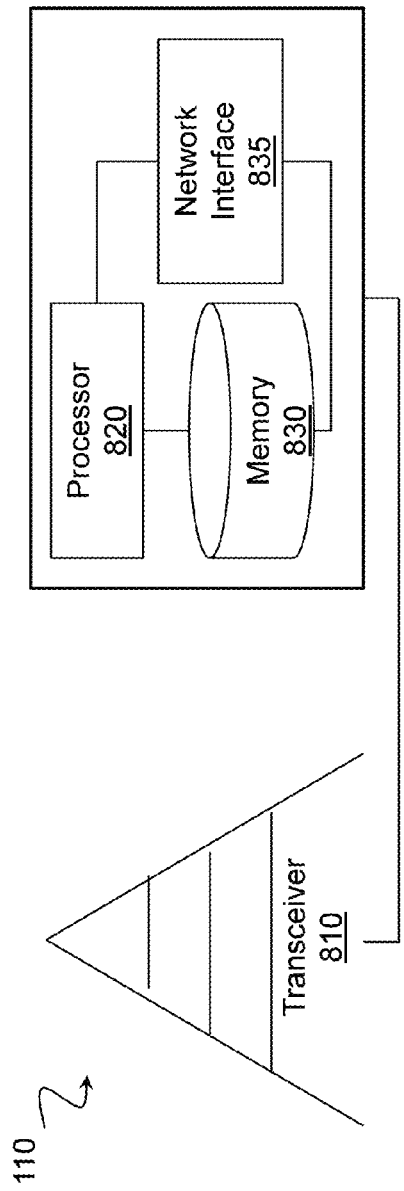
FIGS. 8A-8B are block diagrams illustrating example components of a network node, in accordance with certain embodiments of the disclosure.

FIG. 8A is a block diagram illustrating embodiments of a radio network node. A radio network node may be capable of receiving radio signals or transmitting radio signals in one or more frequencies, and may operate in single-radio access technology, multi-radio access technology, or multi-standard mode (e.g., MSR). Examples of radio network nodes may include cells 110 and 120 of FIG. 1, base stations, femto base stations, home base stations, eNodeBs, small radio base stations, remote radio heads (RRHs), remote radio frequency unit (RRU), fixed relays, mobile relays, transmit-only radio network nodes, receive-only radio network nodes, an access point (e.g., Wi-Fi access point), a low-power node, a cluster head, a radio network controller (RNC), a distributed antenna system (DAS), and/or other radio network nodes (which may be equipped with a UE-like interface in some embodiments). A radio network node may also be a radio node 105 in some embodiments.

The radio network node comprises transceiver 810, processor 820, memory 830, and network interface 840. In some embodiments, transceiver 810 facilitates transmitting wireless signals to and receiving wireless signals from a wireless device (e.g., via an antenna), processor 820 executes instructions to provide some or all of the functionality described above as being provided by a radio network node, memory 830 stores the instructions executed by processor 820, and network interface 840 communicates signals to backend network components, such as a gateway, switch, router, Internet, Public Switched Telephone Network (PSTN), etc.

Processor 820 may comprise any suitable combination of hardware and software implemented in one or more modules to execute instructions and manipulate data to perform some or all of the described functions of radio network node 110 or 120. In some embodiments, processor 820 may include, for example, one or more computers, one or more central processing units (CPUs), one or more microprocessors, one or more applications, and/or other logic.

Memory 830 is generally operable to store instructions, such as a computer program, software, an application comprising one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for the radio network node, send output from the radio network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Alternative embodiments of the radio network node may include additional components beyond those shown in FIG. 8A that may be responsible for providing certain aspects of the access node's functionality, including any of the functionality described herein and/or any additional functionality (including any functionality necessary to support the solution described herein). The various different types of radio access nodes may include components having the same physical hardware but configured (e.g., via programming) to support different radio access technologies, or may represent partly or entirely different physical components.

Figure 8B:
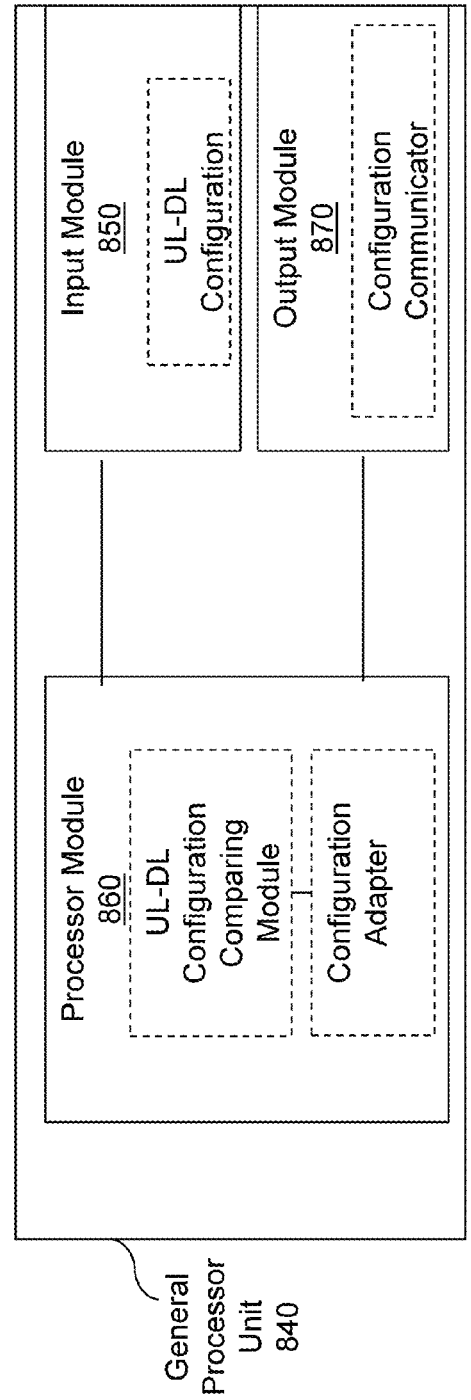

FIG. 8B illustrates an example of components of network node 110/120, in accordance with certain embodiments of the disclosure. In particular, FIG. 8B illustrates a general processor unit 840 comprising an input module 850, a processor module 860, and an output module 870. In certain embodiments, a UL-DL configuration module of input module 850 receives information associated with a first uplink-downlink, UL-DL, configuration used in a first cell and a second uplink-downlink, UL-DL, configuration used in a second cell. Input module 850 communicates the information to processor module 860. A UL-DL configuration comparing module of processor module 860 determines that the first UL-DL configuration and the second UL-DL configuration are different during an overlapping time period. In response, a configuration adapter module of processor module 860 adapts at least one of: a measurement configuration for performing a measurement, scheduling transmission of signals, and scheduling reception of signals. In some embodiments, processor module 860 may then send the adapted configuration to output module 870, for example, so that a configuration communicator module of output module 870 can communicate the adapted configuration to be applied by network node 110/120 or the wireless device being served by network node 110/120 (e.g., UE 105). In some embodiments, the modules described with respect to FIG. 8B may be implemented using one or more processors 820 described with respect to FIG. 8A.

Radio network node and/or wireless device signaling herein, at least in some embodiments, may comprise signaling via higher layer or physical layer, via direct link or logical link (e.g., via another node, another network node, device, hop, etc.), via radio and/or fixed interface, via control plane and/or user plane. Some examples of signals/channels that may be supported on the downlink include: PSS/SSS, PBCH, SIB1, channel with system information (SI) data, sparsely transmitted reference signals (e.g., PRS transmitted in positioning occasions with periodicity of at least 160 ms), control channels, DL channels comprising grants for UL transmissions or UL transmission configuration for a UE, any radio signal sparsely transmitted, DwPTS. The DL signals/channels may be unicast, multicast or broadcast. Some examples of signals/channels that may be supported on the uplink include: SRS, D2D-related radio signals/channels transmitted in the UL spectrum, UL channels with ACK/NACKs to DL receptions received by the UE, any sparsely transmitted radio signal/channel, random access transmission resource or opportunity e.g., UpPTS. The UL signals/channels may be unicast, multicast or broadcast (e.g., with D2D communication).

Modifications, additions, or omissions may be made to the above embodiments and other methods disclosed herein without departing from the scope of the invention. The methods may include more, fewer, or other steps. Additionally, steps may be performed in any suitable order.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Although this disclosure has been described in terms of certain embodiments, alterations and permutations of the embodiments will be apparent to those skilled in the art. The embodiments described herein may be combined with each other in any way. Although some embodiments have been described with reference to certain radio access technologies, any suitable radio access technology (RAT) may be used, such as long term evolution (LTE) (FDD or TDD), LTE-Advanced, UTRA, UMTS, HSPA, GSM, cdma2000, WiMax, and WiFi. Moreover, various embodiments may support single-RAT or multi-RAT configurations. In addition the proposed solutions may also be applied to multi-point transmission and/or reception systems, carrier aggregation systems, and multi-point carrier aggregation systems. Accordingly, the above description of the embodiments does not constrain this disclosure. Other changes, substitutions, and alterations are possible without departing from the spirit and scope of this disclosure.

The invention claimed is:

1. A method in a radio node served by a network node, the method comprising:
   determining a first uplink-downlink, UL-DL, configuration used in a first cell;
   determining a second uplink-downlink, UL-DL, configuration used in a second cell;
   receiving at least one of:
      a measurement configuration for performing a measurement in at least one of the first cell and the second cell,
      a scheduling for transmission of signals at the radio node in at least one of the first cell and the second cell, and
      a scheduling for reception of signals at the radio node in at least one of the first cell and the second cell;
   determining that the first UL-DL configuration and the second UL-DL configuration are different during an at least partly overlapping time period; and
   in response to determining that the first UL-DL configuration and the second UL-DL configuration are different, dynamically adapting at least one of:
      the measurement configuration for performing a measurement in at least one of the first cell and the second cell,
      the scheduling for transmission of signals at the radio node in at least one of the first cell and the second cell, and
      the scheduling for reception of signals at the radio node in at least one of the first cell and the second cell.

2. The method of claim 1, wherein the first UL-DL configuration and the second UL-DL configuration are different when:
   the first UL-DL configuration comprises at least part of a UL configuration during the at least partly overlapping time period,
   the second UL-DL configuration comprises at least part of a DL configuration during the at least partly overlapping time period, and
   the part of the UL configuration overlaps at least in part with the part of the DL configuration during the at least partly overlapping time period.

3. The method of claim 1, wherein the radio node is not capable of simultaneous transmit and receive operations when the first UL-DL configuration and the second UL-DL configuration are different.

4. The method of claim 1, wherein dynamically adapting the measurement configuration comprises one or more of:
   not performing the measurement during the at least partly overlapping time period,
   performing the measurement but not transmitting during the at least partly overlapping time period,
   performing the measurement during the at least partly overlapping time period at least in pre-defined resources, and
   performing the measurement during the at least partly overlapping time period provided a certain condition is met.

5. The method of claim 1, wherein dynamically adapting the scheduling of the radio node transmission comprises any one or more of:
not transmitting during the at least partly overlapping time period, and
delaying or dropping a transmission scheduled during the at least partly overlapping time period.

6. The method of claim 1, wherein dynamically adapting the scheduling of the radio node transmission comprises dropping a transmission scheduled during the at least partly overlapping time period.

7. The method of claim 1, wherein dynamically adapting the scheduling of the radio node reception comprises any one or more of:
not receiving during the at least partly overlapping time period, and
delaying or dropping a reception scheduled during the at least partly overlapping time period.

8. The method of claim 1, wherein dynamically adapting the scheduling comprises:
not scheduling in the first cell's UL subframes that partly or fully overlap in time with at least one of the second cell's DL subframes per time period; and
not scheduling in the first cell's DL subframes that partly or fully overlap in time with at least one of the second cell's UL subframes per time period.

9. A method in a network node serving a radio node, the method comprising:
determining a first uplink-downlink, UL-DL, configuration used in a first cell;
determining a second uplink-downlink, UL-DL, configuration used in a second cell;
transmitting, in at least one of the first cell and the second cell, at least one of:
a measurement configuration for performing a measurement,
a scheduling of the network node's transmission of signals to the radio node, and
a scheduling of the network node's reception of signals from the radio node;
determining that the first UL-DL configuration and the second UL-DL configuration are different during an at least partly overlapping time period; and
in response to determining that the first UL-DL configuration and the second UL-DL configuration are different, dynamically adapting, in at least one of the first cell and the second cell, at least one of:
the measurement configuration for performing the measurement,
the scheduling of the network node's transmission of signals to the radio node, and
the scheduling of the network node's reception of signals from the radio node.

10. The method of claim 9, wherein the first UL-DL configuration and the second UL-DL configuration are different when:
the first UL-DL configuration comprises at least part of the UL configuration during the at least partly overlapping time period,
the second UL-DL configuration comprises at least part of the DL configuration during the at least partly overlapping time period, and
the part of the UL configuration overlaps at least in part with the part of the DL configuration during the at least partly overlapping time period.

11. The method of claim 9, further comprising dynamically adapting the radio node scheduling configuration provided that the radio node is not capable of simultaneously receiving and transmitting signals between the first cell and the second cell.

12. The method of claim 9, wherein dynamically adapting the measurement configuration comprises one or more of:
not performing the measurement during the at least partly overlapping time period,
performing the measurement but not transmitting during the at least partly overlapping time period,
performing the measurement during the at least partly overlapping time period at least in pre-defined resources, and
performing the measurement during the at least partly overlapping time period provided a certain condition is met.

13. The method of claim 9, wherein dynamically adapting the scheduling of the transmission to the radio node comprises any one or more of:
not transmitting during the at least partly overlapping time period, and
delaying or dropping a transmission scheduled during the at least partly overlapping time period.

14. The method of claim 9, wherein dynamically adapting the scheduling comprises:
not scheduling in the first cell's DL subframes that partly or fully overlap in time with at least one of the second cell's UL subframes per time period.

15. The method of claim 9, wherein dynamically adapting the scheduling comprises:
not scheduling in the first cell's UL subframes that partly or fully overlap in time with at least one of the second cell's DL subframes per time period.

16. A radio node comprising:
one or more processors coupled to a memory including instructions which, when executed by the one or more processors, perform the steps of:
determining a first uplink-downlink, UL-DL, configuration used in a first cell;
determining a second uplink-downlink, UL-DL, configuration used in a second cell;
receiving at least one of:
a measurement configuration for performing a measurement in at least one of the first cell and the second cell,
a scheduling for transmission of signals at the radio node in at least one of the first cell and the second cell, and
a scheduling for reception of signals at the radio node in at least one of the first cell and the second cell;
determining that the first UL-DL configuration and the second UL-DL configuration are different during an at least partly overlapping time period; and
in response to the one or more processors determining that the first UL-DL configuration and the second UL-DL configuration are different, dynamically adapting at least one of:
the measurement configuration for performing a measurement in at least one of the first cell and the second cell,
the scheduling for transmission of signals at the radio node in at least one of the first cell and the second cell, and
the scheduling for reception of signals at the radio node in at least one of the first cell and the second cell.

17. The radio node of claim 16, wherein the first UL-DL configuration and the second UL-DL configuration are different when:
- the first UL-DL configuration comprises at least part of a UL configuration during the at least partly overlapping time period,
- the second UL-DL configuration comprises at least part of a DL configuration during the at least partly overlapping time period, and
- the part of the UL configuration overlaps at least in part with the part of the DL configuration during the at least partly overlapping time period.

18. The radio node of claim 16, wherein the radio node is not capable of simultaneous transmit and receive operations when the first UL-DL configuration and the second UL-DL configuration are different.

19. The radio node of claim 16, wherein the memory further comprises instructions which, when executed by the one or more processors, perform the steps of dynamically adapting the measurement configuration to:
- not perform the measurement during the at least partly overlapping time period,
- perform the measurement but not transmitting during the at least partly overlapping time period,
- perform the measurement during the at least partly overlapping time period at least in pre-defined resources, and/or
- perform the measurement during the at least partly overlapping time period provided a certain condition is met.

20. The radio node of claim 16, wherein the memory further comprises instructions which, when executed by the one or more processors, perform the steps of dynamically adapting the scheduling transmission to:
- not transmit during the at least partly overlapping time period, and/or
- delay or drop a transmission scheduled during the at least partly overlapping time period.

21. The radio node of claim 16, wherein the memory further comprises instructions which, when executed by the one or more processors, perform the steps of dynamically adapting the scheduling reception to:
- not receive during the at least partly overlapping time period, and/or
- delay or drop a reception scheduled during the at least partly overlapping time period.

22. The radio node of claim 16, wherein the memory further comprises instructions which, when executed by the one or more processors, perform the steps of dynamically adapting the scheduling to:
- not schedule in the first cell's UL subframes that partly or fully overlap in time with at least one of the second cell's DL subframes per time period; and
- not schedule in the first cell's DL subframes that partly or fully overlap in time with at least one of the second cell's UL subframes per time period.

23. A network node comprising:
- one or more processors coupled to a memory including instructions which, when executed by the one or more processors, perform the steps of:
  - determining a first uplink-downlink, UL-DL, configuration used in a first cell;
  - determining a second uplink-downlink, UL-DL, configuration used in a second cell;
  - transmitting, in at least one of the first cell and the second cell, at least one of:
    - a measurement configuration for performing a measurement,
    - a scheduling of the network node's transmission of signals to the radio node, and
    - a scheduling of the network node's reception of signals from the radio node;
  - determining that the first UL-DL configuration and the second UL-DL configuration are different during an at least partly overlapping time period; and
  - in response to the one or more processors determining that the first UL-DL configuration and the second UL-DL configuration are different, dynamically adapting, in at least one of the first cell and the second cell, at least one of:
    - the measurement configuration for performing a measurement,
    - the scheduling of the network node's transmission of signals to a radio node, and
    - the scheduling of the network node's reception of signals from the radio node.

24. The network node of claim 23, wherein the first UL-DL configuration and the second UL-DL configuration are different when:
- the first UL-DL configuration comprises at least part of the UL configuration during the at least partly overlapping time period,
- the second UL-DL configuration comprises at least part of the DL configuration during the at least partly overlapping time period, and
- the part of the UL configuration overlaps at least in part with the part of the DL configuration during the at least partly overlapping time period.

25. The network node of claim 23, wherein the memory further comprises instructions which, when executed by the one or more processors, perform the steps of adapting the radio node scheduling configuration provided that the radio node is not capable of simultaneously receiving and transmitting signals between the first cell and the second cell.

26. The network node of claim 23, wherein the memory further comprises instructions which, when executed by the one or more processors, perform the steps of dynamically adapting the measurement configuration to:
- not perform the measurement during the at least partly overlapping time period,
- perform the measurement but not transmitting during the at least partly overlapping time period,
- perform the measurement during the at least partly overlapping time period at least in pre-defined resources, and/or
- perform the measurement during the at least partly overlapping time period provided a certain condition is met.

27. The network node of claim 23, wherein the memory further comprises which, when executed by the one or more processors, perform the steps of dynamically adapting the scheduling of the transmission to:
- not transmit during the at least partly overlapping time period, and/or
- delay or drop a transmission scheduled during the at least partly overlapping time period.

28. The network node of claim 23, wherein the memory further comprises which, when executed by the one or more processors, perform the steps of dynamically adapting the scheduling to:
- not schedule in the first cell's DL subframes that partly or fully overlap in time with at least one of the second cell's UL subframes per time period.

29. The network node of claim 23, wherein the memory further comprises instructions which, when executed by the one or more processors, perform the steps of dynamically adapting the scheduling to:
not schedule in the first cell's UL subframes that partly or fully overlap in time with at least one of the second cell's DL subframes per time period.

* * * * *